US011762663B2

(12) United States Patent
Miyanaga

(10) Patent No.: US 11,762,663 B2
(45) Date of Patent: Sep. 19, 2023

(54) INFORMATION PROCESSING PROGRAM, INFORMATION PROCESSING DEVICE, AND INFORMATION PROCESSING METHOD

(71) Applicant: SOFTGEAR CO., LTD., Tokyo (JP)

(72) Inventor: Naoki Miyanaga, Tokyo (JP)

(73) Assignee: SOFTGEAR CO., LTD., Tokyo (JP)

( * ) Notice: Subject to any disclaimer, the term of this patent is extended or adjusted under 35 U.S.C. 154(b) by 0 days.

(21) Appl. No.: 18/071,627

(22) Filed: Nov. 30, 2022

(65) Prior Publication Data

US 2023/0205536 A1  Jun. 29, 2023

Related U.S. Application Data

(63) Continuation of application No. PCT/JP2022/025042, filed on Jun. 23, 2022.

(30) Foreign Application Priority Data

Jul. 30, 2021 (JP) .................................. 2021-125358
Dec. 9, 2021 (JP) .................................. 2021-200032

(51) Int. Cl.
*G06F 9/38* (2018.01)
*G06F 9/50* (2006.01)
(Continued)

(52) U.S. Cl.
CPC ............ *G06F 9/381* (2013.01); *G06F 9/5027* (2013.01); *G06F 3/0656* (2013.01); *G06F 13/4059* (2013.01)

(58) Field of Classification Search
CPC .... G06F 3/0656; G06F 13/4059; G06F 9/544; G06F 5/06
See application file for complete search history.

(56) References Cited

U.S. PATENT DOCUMENTS 5,608,866 A * 3/1997 Horikawa ............. G06F 11/348
714/39
6,058,434 A * 5/2000 Wilt ........................ G06F 13/00
719/310

(Continued)

FOREIGN PATENT DOCUMENTS

CN  1219705 A  6/1999
CN  1734433 A  2/2006
(Continued)

OTHER PUBLICATIONS

Written Opinion of the International Searching Authority in International Application No. PCT/JP2022/025042, dated Jul. 26, 2022.
(Continued)

*Primary Examiner* — Tom Y Chang
(74) *Attorney, Agent, or Firm* — HAUPTMAN HAM, LLP

(57) ABSTRACT

Provided are an information processing program, an information processing device, and an information processing method that enable application processing and data transmission in a non-blocking manner to increase a communication speed. A server device includes buffering means configured to accumulate events, socket writing means configured to process the events, and flag management means configured to exclusively set a flag. The socket writing means includes socket write request means and callback processing means. The flag management means exclusively sets the flag at a timing before the event processing requested by the socket write request means starts, and releases the flag at a timing after the processing by the callback processing means ends. The socket write request means receives a call, and in a case where the flag is set, the events accumulated by the buffering means are processed.

16 Claims, 13 Drawing Sheets

(51) Int. Cl.
 *G06F 3/06* (2006.01)
 *G06F 13/40* (2006.01)

(56) References Cited

U.S. PATENT DOCUMENTS

| | | | |
|---|---|---|---|
| 6,243,769 B1* | 6/2001 | Rooney | G06F 5/065 710/52 |
| 7,127,535 B1* | 10/2006 | Huebsch | G06F 11/1464 714/E11.12 |
| 2002/0031132 A1* | 3/2002 | McWilliams | H04L 12/5601 370/466 |
| 2002/0171870 A1 | 11/2002 | Isoda et al. | |
| 2004/0054823 A1* | 3/2004 | Rooney | G06F 13/4059 710/33 |
| 2005/0283589 A1* | 12/2005 | Matsuo | G06F 9/30014 712/217 |
| 2008/0126625 A1* | 5/2008 | Gilgen | G06F 13/387 710/56 |
| 2013/0205074 A1* | 8/2013 | Chung | G06F 3/0679 711/103 |
| 2014/0297966 A1 | 10/2014 | Aoyagi et al. | |
| 2015/0169456 A1 | 6/2015 | Suzuki et al. | |

FOREIGN PATENT DOCUMENTS

| | | |
|---|---|---|
| CN | 102947807 A | 2/2013 |
| CN | 103501245 A | 1/2014 |
| CN | 104077238 A | 10/2014 |
| CN | 112579097 A | 3/2021 |
| CN | 112667212 A | 4/2021 |
| CN | 112667217 A | 4/2021 |
| JP | H962772 A | 3/1997 |
| JP | 2009015429 A | 1/2009 |
| JP | 201055214 A | 3/2010 |
| JP | 2014229036 A | 12/2014 |
| JP | 201762540 A | 3/2017 |

OTHER PUBLICATIONS

Office Action in JP Application No. 2021-125358, dated Oct. 5, 2021. 6pp.
Office Action in JP Application No. 2021-200032, dated Mar. 8, 2022. 6pp.
Search Report and Written Opinion of the International Searching Authority in International Application No. PCT/JP2022/025042, dated Jul. 26, 2022. 12pp.
Office Action in CN Application No. 202280004572.X, dated Jun. 4, 2023. 12pp.

* cited by examiner

INFORMATION PROCESSING PROGRAM, INFORMATION PROCESSING DEVICE, AND INFORMATION PROCESSING METHOD

CROSS-REFERENCE TO RELATED APPLICATIONS

The present application is a bypass continuation application based on and claims the benefit of priority from the prior Japanese patent applications 2021-125358 filed on Jul. 30, 2021 and 2021-200032 filed on Dec. 9, 2021, and PCT Application No. PCT/JP2022/025042 filed Jun. 23, 2022, the entire contents of which are incorporated herein by reference.

TECHNICAL FIELD

One embodiment of the present invention relates to an information processing program, an information processing device, and an information processing method.

BACKGROUND ART

As a conventional technology, an information processing device that transmits data by changing a buffer to be used according to the size of data has been proposed (see, for example, Patent Literature 1).

A central processing unit (CPU) of the information processing device disclosed in Patent Literature 1 executes an application task that occupies an application buffer area and a transmission control protocol (TCP)/Internet protocol (IP) task that occupies a ring buffer area in parallel. In the application task, it is determined whether or not the size of data stored in the application buffer area is equal to or smaller than a threshold by data generation processing, and in a case where the determination result is affirmative, the data in the application buffer area is copied to the ring buffer area and a data transmission instruction is issued, and in a case where the determination result is negative, the right to occupy the application buffer area is temporarily granted to the TCP/IP task and the data transmission instruction is issued. In the TCP/IP task, transmission data in a memory area occupied by the TCP/IP task is transmitted in response to the data transmission instruction.

CITATION LIST

Patent Literature

Patent Literature 1: JP 2010-55214 A

SUMMARY OF INVENTION

Technical Problem

However, the information processing device of Patent Literature 1 has a problem that, in a case where the amount of data to be transmitted is small, the data is transmitted using a ring buffer to execute the application task in parallel, and in a case where the amount of data to be transmitted is large, the TCP/IP task is exclusively processed to increase a communication speed, but in a case where the amount of data to be transmitted is large, the application task is blocked and is not processed.

Therefore, an object of the embodiments is to provide an information processing program, an information processing device, and an information processing method that enable application processing and data transmission in a non-blocking manner to increase a communication speed.

Solution to Problem

In order to achieve the above-described object, aspects of the embodiments provide the following information processing program, information processing device, and information processing method.

Aspects of a first embodiment include an information processing program that causes a computer to function as: event accumulation means configured to accumulate events to be processed; buffering means configured to accumulate the events; processing means configured to process the accumulated events; and flag management means configured to receive a call and exclusively set a flag, in which the processing means includes processing request means configured to request event processing, and callback processing means configured to receive a completion notification and execute processing in a case where the event processing is completed, the flag management means exclusively sets the flag at a timing before the event processing requested by the processing request means starts, and releases the flag at a timing after the processing by the callback processing means ends, and the processing request means receives a call at a timing after the event accumulation in the buffering means by the event accumulation means ends and at a timing after the event processing by the callback processing means ends, and in a case where the flag of the flag management means is not set, the event processing is not executed, and in a case where the flag is set, the events accumulated by the buffering means are processed.

Aspects of a second embodiment include the information processing program according to the first embodiment, in which the buffering means includes first buffering means configured to accumulate events and second buffering means configured to accumulate the events accumulated in the first buffering means, and in a case where the flag is set, the processing request means moves the events from the first buffering means to the second buffering means to accumulate the events in the second buffering means, and processes all or some of the events accumulated by the second buffering means.

Aspects of a third embodiment include the information processing program according to the second embodiment, further including one or more buffering means between the first buffering means and the second buffering means upstream of the first buffering means or downstream of the second buffering means.

Aspects of a fourth embodiment include the information processing program according to the second or the third embodiment, in which at least one of a size of a data block, the number of data blocks, a type of the data block, or an event holding format of the data block is changed in movement between the buffering means.

Aspects of a fifth embodiment include the information processing program according to any one of the second to the fourth embodiments, in which the number and size of moved events are limited under a predetermined condition in movement between the buffering means.

Aspects of a sixth embodiment include the information processing program according to any one of the first to the fifth embodiments, in which an event accumulation operation of the event accumulation means and a processing operation of the processing means are asynchronously performed for the buffering means.

Aspects of a seventh embodiment include the information processing program according to any one of the first to the sixth embodiments, in which each event accumulation means executed by a plurality of event generation sources operating in parallel accumulates events asynchronously in the buffering means.

Aspects of a eighth embodiment include the information processing program according to any one of the first to the seventh embodiments, in which the buffering means is a ring buffer.

Aspects of a nineth embodiment include the information processing program according to the first embodiment, in which the buffering means is a ring buffer that sequentially accumulates the event itself in a memory area.

Aspects of a tenth embodiment include the information processing program according to the second, the sixth, or the seventh embodiment, in which the buffering means has a two-stage ring buffer configuration, a first-stage ring buffer accumulates events of the event accumulation means operating in parallel, and a second-stage ring buffer concatenates and divides the events into a size determined according to processing by the processing means and holds the events by a number determined according to the processing means.

Aspects of an eleventh embodiment include the information processing program according to the first and the second embodiments, or any one of the sixth to the tenth embodiments, in which the buffering means stores the events in a direct buffer.

Aspects of a twelfth embodiment include the information processing program according to any one of the first and the second embodiments, or any one of the sixth to the tenth embodiments, in which the buffering means accumulates the events in a buffer of a buffer pool.

Aspects of a thirteenth embodiment include the information processing program according to the tenth embodiment, in which the buffering means accumulates the events in buffers of a buffer pool having different buffer sizes in the first-stage ring buffer and the second-stage ring buffer.

Aspects of a fourteenth embodiment include the information processing program according to any one of the first to the thirteenth embodiments, in which the processing means ends the event processing after processing all the accumulated events.

Aspects of a fifteenth embodiment include an information processing device including: event accumulating means configured to accumulate an event to be processed; buffering means configured to accumulate the event; processing means configured to process the accumulated event; and flag management means configured to receive a call and exclusively set a flag, in which the processing means includes processing request means configured to request event processing, and callback processing means configured to receive a completion notification and execute processing in a case where the event processing is completed, the flag management means exclusively sets the flag at a timing before the event processing requested by the processing request means starts, and releases the flag at a timing after the processing by the callback processing means ends, and the processing request means receives a call at a timing after the event accumulation in the buffering means by the event accumulation means ends and at a timing after the event processing by the callback processing means ends, and in a case where the flag of the flag management means is not set, the event processing is not executed, and in a case where the flag is set, the event accumulated by the buffering means is processed.

Aspects of a sixteenth embodiment include an information processing method executed by a computer, the information processing method including: an event accumulation step of accumulating events to be processed; a buffering step of accumulating the events; a processing step of processing the accumulated events; and a flag management step of receiving a call and exclusively setting a flag, in which the processing step includes a processing request step of requesting event processing, and a callback processing step of receiving a completion notification and executing processing in a case where the event processing is completed, in the flag management step, the flag is exclusively set at a timing before the event processing requested in the processing request step starts, and the flag is released at a timing after the processing in the callback processing step ends, and in the processing request step, a call is received at a timing after the event accumulation in the event accumulation step ends and at a timing after the event processing in the callback processing step ends, and in a case where the flag is not set, the event processing is not executed, and in a case where the flag is set, the accumulated events are processed.

Advantageous Effects of Invention

According to the first, the fifteenth and sixteenth embodiments, application processing and data transmission can be performed in a non-blocking manner to increase a communication speed.

FIRST EMBODIMENT (Configuration of Communication Management System)

Figure 1:
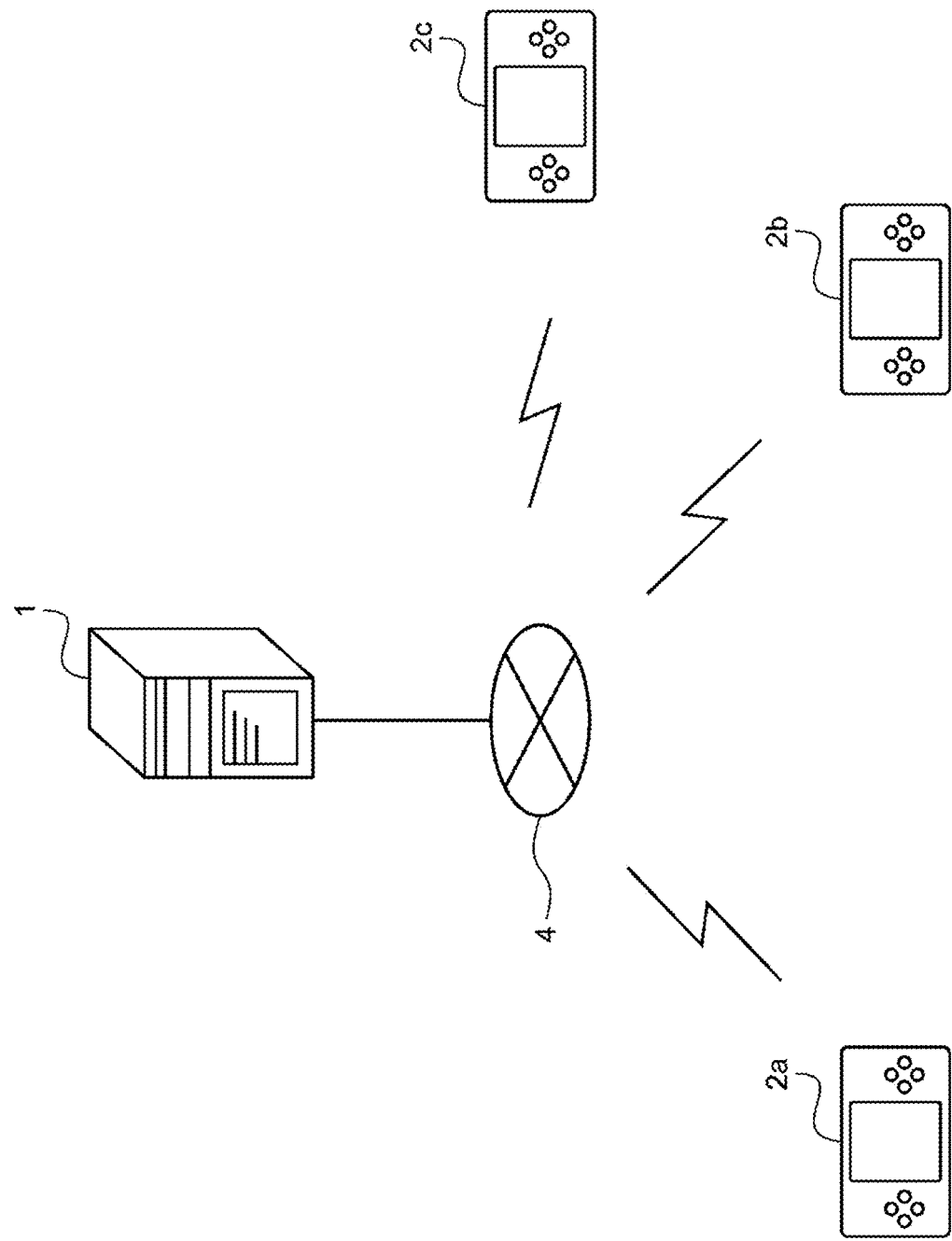
FIG. 1 is a schematic diagram illustrating an example of a configuration of a communication management system according to an embodiment.

FIG. 1 is a schematic diagram illustrating an example of a configuration of a communication management system according to an embodiment.

This communication management system is configured by connecting a server device 1 as an information processing device and terminal devices 2a, 2b, and 2c as clients of the server device 1 in a mutually communicable manner via a network. The device included in the communication management system may be a personal computer, a game terminal, a cloud, or a virtual machine. The network may be a local area network (LAN), the Internet, a virtual network, or the like.

The server device 1 is a server type information processing device which operates in response to a request from the terminal devices 2a, 2b, and 2c operated by operators, and includes, in a main body thereof, electronic components such as a central processing unit (CPU), a hard disk drive (HDD), a flash memory, a volatile memory, and a (wireless/wired) LAN board having functions for processing information. The server device 1 communicates with the terminal devices 2a, 2b, and 2c and transmits and receives data to synchronize data handled by the terminal devices 2a, 2b, and 2c, and is, for example, a game server or the like. When the synchronization operation is performed, the server device 1 frequently exchanges data having a small volume, but the present invention is not limited thereto. Note that the server device 1 may be either configured with a plurality of clusters or configured to execute distributed processing. Alternatively, the server device 1 may be configured as a virtual machine may be configured as a virtual machine in a cloud environment.

The terminal devices 2a, 2b, and 2c are terminal-type information processing devices which operate based on a program, and each include, in a main body thereof, electronic components such as a CPU, a HDD, or a flash memory having functions for processing information. The terminal devices 2a, 2b, and 2c operate based on a program such as a massively multiplayer online game (MMOG), for example, sequentially output data as a result of the operation to the server device 1, and receive data as a result of the operation of another terminal from the server device 1 to frequently synchronize game objects between the terminal devices 2a, 2b, and 2c. Note that, although three terminal devices 2a, 2b, and 2c are illustrated, the number of terminal devices may be one or two, or may be four or more. Preferably, a configuration in which communication is possible even in a case where about 1000 terminal devices are connected.

The network 4 is a communication network enabling high-speed communication, and is, for example, a wired or wireless communication network such as an intranet or a local area network (LAN).

As an example, in the communication management system according to the first embodiment, a MMOG in which a plurality of participants do an activity, for example, a plurality of participants play a game, in a common virtual space is executed. The server device 1 and the terminal devices 2a, 2b, and 2c operate to synchronize information (synchronization target object) held as an object in each device with the progress of a game between the devices, and in particular, the server device 1 provides a buffer between an application and a network interface card (NIC) to control an operation of data transmission/reception between the application and the NIC in order to increase a data communication speed. In other words, in a case where a large number of requests for performing writing asynchronously are generated for a shared resource (socket or NIC) by multi-processing or multi-threading, since exclusive control is required to perform serialization to prevent data from being mixed, in order to efficiently use a transmission communication path (in particular, improve throughput after a transmission passage is congested with data), data is buffered in the buffer, exclusive control (blocking) is performed by writing to the buffer, and lock-free (non-blocking) control is performed by compare-and-swap (CAS) or the like for writing to the shared resource from the buffer. Details of the operation will be specifically described in regard to the embodiment.

In addition, terms such as "object" used in the first embodiment are used synonymously with those used in the context of, for example, Java (registered trademark), C++, C#, Python, JavaScript (registered trademark), Ruby, or the like, but hereinafter, the class and the instantiated class (instance) may be collectively referred to as an "object".

(Configuration of Server Device)

Figure 2:
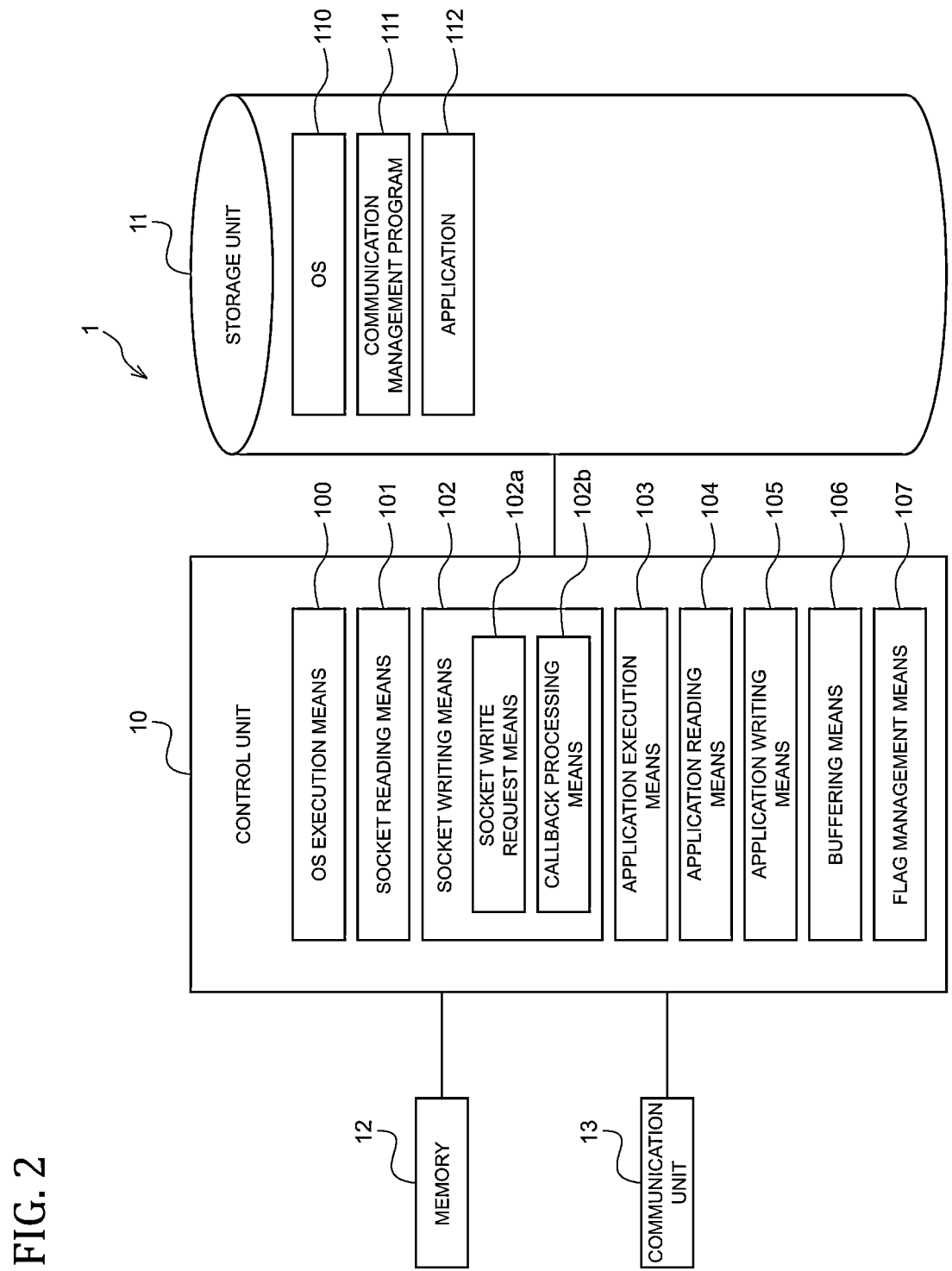
FIG. 2 is a block diagram illustrating an example of a configuration of a server device according to an embodiment.

FIG. 2 is a block diagram illustrating an example of a configuration of the server device 1 according to the first embodiment. Although implementation in the server device 1 will be described below, the terminal devices 2a, 2b, and 2c may have similar configurations.

The server device 1 includes a control unit 10 that includes a central processing unit (CPU) and the like, controls each unit, and executes various programs, a storage unit 11 that includes a storage medium such as a flash memory and stores information, a memory 12 that includes a volatile storage medium and temporarily stores information, and a communication unit 13 that communicates with the outside via a network.

The control unit 10 functions as operating system (OS) execution means 100 (including a Java virtual machine (JVM) in a case of Java) by executing an OS 110, functions as application execution means 103, application reading means 104, and application writing means 105 by executing an application 112, and functions as socket reading means 101, socket writing means 102, buffering means 106 (including a reception buffer 106a and a transmission buffer 106b), flag management means 107, and the like by executing a communication management program 111 as an information processing program.

The OS execution means 100 (OS kernel) executes the OS 110 and provides each function of the OS 110. The OS execution means 100 particularly controls the communication unit 13 (NIC) to transmit data to the network and receive data from the network. Note that, in a case of using JAVA, the Java virtual machine (VM) is also regarded as a part of the OS, and is executed by the OS execution means 100.

The application execution means 103 executes the application 112 as processing means and provides each function of the application 112, and processes a single thread or a plurality of threads with the execution. Typically, each thread performs network communication (transmission and reception) via a single socket or a plurality of sockets (an IP address and a port number of a communication target program of the terminal device 2a, 2b, or 2c) respectively corresponding to a single terminal device or a plurality of terminal devices.

In particular, the application reading means 104 reads data of the reception buffer 106a corresponding to a reception target socket (the terminal device 2a, 2b, or 2c) for reception processing of the thread as a function of the application 112.

The application writing means 105 writes data generated as a result of processing of the thread to a transmission buffer for transmission processing corresponding to a transmission target socket (the terminal device 2a, 2b, or 2c). The written data is normally added to the transmission buffer 121b in the writing order. For example, in a case where the game server performs relay processing for synchronization information for game object synchronization processing, the application writing means 105 receives data of the synchronization information from the terminal device 2a and transmits the data of the synchronization information to the terminal devices 2b and 2c as a result of processing the received data by the thread. The application writing means 105 writes data to two transmission buffers 121b corresponding to two sockets corresponding to the respective terminal devices. After adding data to the transmission buffer 121b, the application writing means 105 calls socket write request means 102a.

In particular, the socket reading means 101 reads data received by the socket in communication with the network to the reception buffer 106a described later as a function of the OS 110.

The socket writing means 102 as processing means functions as the socket write request means 102a and callback processing means 102b as processing request means.

Figure 6:
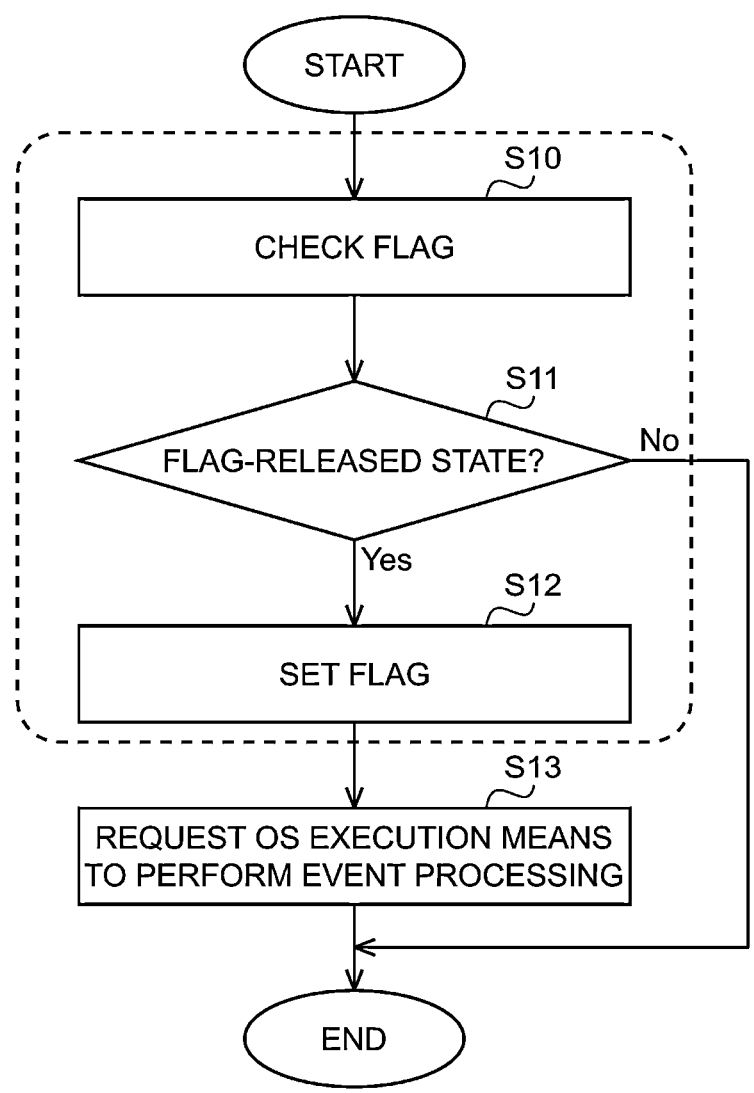
FIG. 6 is a flowchart for describing an operation example of socket write request means.
Figure 7:
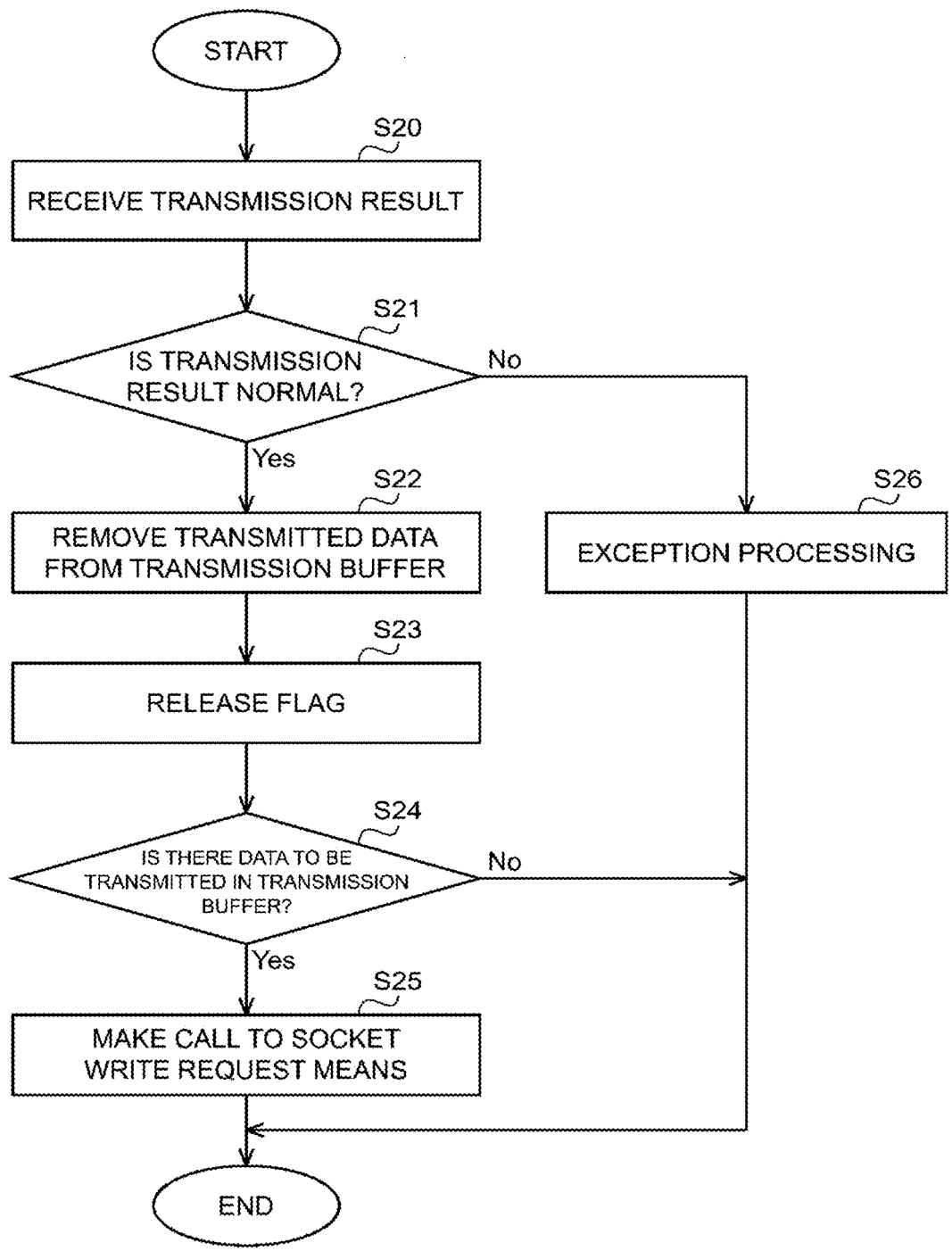
FIG. 7 is a flowchart for describing an operation example of callback processing means.
Figure 8:
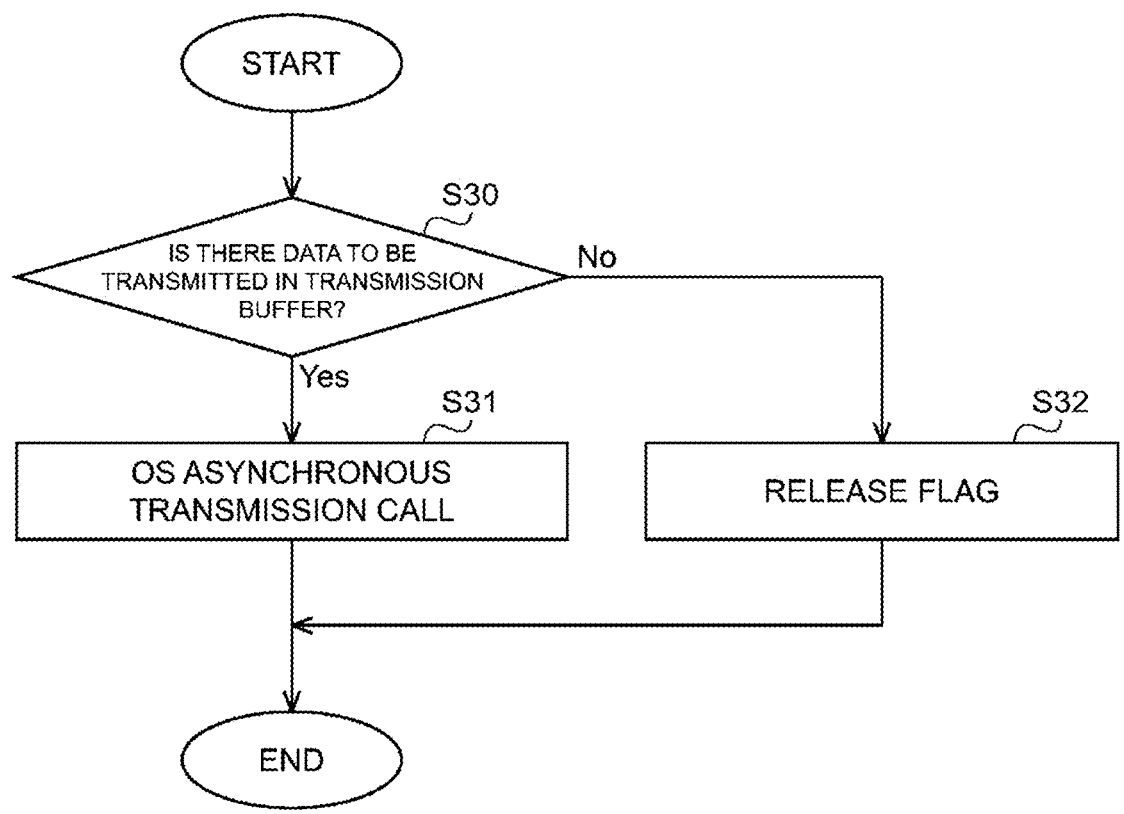
FIG. 8 is a flowchart for describing an operation example of the socket write request means.

FIGS. 6 and 8 are flowcharts for describing an operation example of the socket write request means 102a. FIG. 7 is a flowchart for describing an operation example of the callback processing means 102b.

As illustrated in FIG. 6, the socket write request means 102a first requests the flag management means 107 to check a state of a flag managed by the flag management means 107 (S10), and in a case where the flag is released (S11; Yes), and the flag is set (S12). The socket write request means 102a is called asynchronously immediately before the application writing means 105 ends processing of writing an event to the ring buffer 121b or immediately before the corresponding callback processing means 102b executed after completion of the socket write request means 102a is completed. The call may be a call of a normal method or function, or may be startup by signaling to a standby thread using an OS function. Once the flag is set, next, the socket write request means 102a writes data to be transmitted by communication with the network to the socket from the transmission buffer 106b, and requests the OS execution means 100 to execute the event processing (S13). In a case where the flag managed by the flag management means 107 has already been set (Step S11; No), the processing immediately ends. Note that, here, for ease of understanding, the checking of the flag S10/S11 and the changing of the flag S12 have been described as three separate blocks. However, in a multi-thread environment, when switching to another thread is made, and the another thread interrupts between the checking of the flag S10 and the setting of the flag S12, the flat is set for each of the plurality of threads (S12), and the event processing is executed (S13) because the flag is set for its own thread. Therefore, there is a possibility that the event processing (S13) is executed a plurality of times at the same time, which is inconvenient. In order to solve this problem, in the present invention, instead of exclusively controlling the execution of the socket writing means 102a by blocking, the checking of the flag (S10/S11) and the change setting (S12) are performed by a single CPU instruction using the function of compare-and-swap (CAS) provided by the flag management means 107 as described later, and a method has been devised to prevent other threads from being executed during the processing of S10, S11, and S12.

Further, as illustrated in FIG. 8, the socket write request means 102a checks whether or not there is data to be transmitted in the transmission buffer 106b in Step S13 (S30), and in a case where there is data to be transmitted (S30; Yes), an OS asynchronous transmission request is made to request the OS execution means 100 to execute the event processing (S31). Further, in a case where there is no data to be transmitted (S30; No), the socket write request means 102a requests the flag management means 107 to release the flag (S32).

As illustrated in FIG. 7, when the OS execution means 100 has completed processing of a write event requested by the socket write request means 102a (S31 in FIG. 8), the callback processing means 102b receives a completion notification from the OS execution means 100 and (asynchronously) executes processing. A network transmission result of the OS execution means 100 is received (S20). In a case where the transmission result is normal (S21; Yes), the callback processing means 102b excludes the transmitted data from the transmission buffer (S22). Subsequently, the callback processing means 102b requests the flag management means 107 to release the flag (S23). Subsequently, the callback processing means 102b confirms that data to be transmitted exists in the transmission buffer (S24). In a case where the confirmation result is affirmative (in a case where there is data in the transmission buffer) (S24; Yes), the callback processing means 102b makes a call to the socket write request means 102a (S25). In a case where the confirmation result is negative (S24; No), the callback processing means 102b ends the processing. In a case where the transmission result is abnormal (S21; No), the callback processing means 102b executes exception processing (disconnecting connection or the like) such as communication interruption and timeout (S26).

Another implementation of the socket write request means 102a and the callback processing means 102b may be configured as follows. For example, the callback processing means 102b receives a result of transmission (asynchronously) performed when the OS execution means 100 receives a completion notification when the processing of the write event requested by the socket write request means 102a is completed. In a case where the transmission result is abnormal, exception processing (disconnecting connection or the like) such as communication interruption and timeout is performed, and the processing ends. In a case where the transmission result is normal, the transmitted data is deleted from the transmission buffer. Subsequently, the callback processing means 102b confirms that the data to be transmitted exists in the transmission buffer, and in a case where the confirmation result is affirmative, the callback processing means 102b makes a call to the socket write request means 102a. In a case where the confirmation result is negative, the flag management means 107 is requested to release the flag, and the processing ends.

As the buffering means 106, two types of buffer areas, the reception buffer 106a and the transmission buffer 106b, are prepared in the memory 12, and both of the reception buffer 106a and the transmission buffer 106b provide a reading target and a writing target and manage data to be read and written. Reading and writing from and to the buffer can be asynchronously performed via the buffer. The socket reading means 101 performs writing and the application reading means 104 performs reading with respect to the reception buffer 106a. The application writing means 105 performs writing and the socket writing means 102 performs reading with respect to the transmission buffer 106b. Note that data may be read from and written to the buffering means 106 (106a and 106b) in a non-blocking manner. Since it is inefficient for the CPU to allocate the memory necessary for the buffer at the time of execution each time, it is common to secure a large memory area (one or more blocks) in advance, add memory chunks obtained by subdividing the memory area to a buffer pool, perform unique memory management using the buffer pool, and reuse the secured memory blocks to thereby improve processing efficiency at the time of execution. In addition, it is also common to logically configure a ring buffer by combining these memory chunks. Here, a case where the ring buffer 121 (a reception ring buffer 121*a* as the reception buffer 106*a* and a transmission ring buffer 121*b* as the transmission buffer 106*b*), which is a type of buffer pool, is used as the buffer area will be described. However, the buffer area is not necessarily a ring buffer, and may be any buffer as long as it can provide a buffer having a logically infinite length. Preferably, a temporary storage area that enables high-speed input and output and is created in a memory area outside a heap area, such as a direct buffer suitable for processing in the OS kernel, is used.

Since the direct buffer exists in the real memory space, it is known that, in OS processing execution, data processing on the direct buffer can reduce the number of internal memory operations and shorten the processing time as compared with data processing on a normal indirect buffer existing in the virtual memory space. Note that the direct buffer is known to take more OS processing time to allocate and release the memory for the application than the indirect buffer. In particular, in a case of the direct buffer, it is not appropriate for the application to frequently allocate and release the memory, and it is desirable to reuse the memory secured in advance by utilizing the buffer pool and the like to be described later. In addition, although the direct buffer is suitable as a processing target of the OS, it is also known that it is inappropriate to use the direct buffer for normal processing since memory access (memory reading and memory writing) of the direct buffer as a processing target of the application takes more time than memory access of the indirect buffer. It is preferable to limit the use of the direct buffer to a use specialized for storage of data for which a processing request is made to the OS without abuse. In addition, the direct buffer is a shared resource used not only by the application but also by other applications executed by the information device, and in a case where the direct buffer is abused, there is a possibility of affecting the operation of other applications of the information device, and it is thus desirable to appropriately save the usage. Although the suitable use method has been described as an example with the first embodiment in mind, the use method of the present invention is not limited thereto.

Next, the buffer pool is assumed to be a pool in which, in order to quickly and dynamically secure a necessary memory area at the time of execution of the application, areas large to some extent are collectively secured from a free area of the main memory as a plurality of memory blocks at the time of activation of the application or the like. The buffer pool does not request the OS to perform memory management, and is implemented as the application. When a memory is needed, a memory of an appropriate size (memory chunk) is borrowed from the secured memory blocks (memory allocation), and a memory that has been used up and became unnecessary is returned to the buffer pool and reused (memory release). Various implementations of the buffer pool are known. Normally, the memory block has a large size such as a page size. Therefore, here, the memory block is divided in advance into memory chunks of one type or two or more types of standardized sizes that are easy to use in the application and registered in the buffer pool. The chunk size is usually adjusted to be 1/perfect power of 2 of the page size. The memory block can be divided without waste by setting the chunk size to 1/perfect power of 2. Further, by reusing a memory block having a standardized chunk size, occurrence of memory fragmentation can be avoided. In addition, it is known that managing a memory as the buffer pool by the application does not cause an overhead of an OS call or the like in individual memory allocation and release unlike a case where memory allocation and release are used for the OS each time it is necessary, and thus the memory allocation and release processing is made efficient. In a case where the buffer pool is adopted, various design strategies can be considered for the size, type, and number of memory chunks to be registered in the pool depending on the usage. Although the suitable use method has been described as an example with the first embodiment in mind, the use method of the present invention is not limited thereto.

In the first embodiment, in a case where the buffer pool is used, the chunk size (for example, as the page size, the memory block as it is, or a half of the memory block) standardized to a size suitable for OS processing is used as the size of the memory chunk, and a memory of the direct buffer suitable for OS processing is used as the type of the memory. By densely packing event data into a memory chunk of a large size (for example, the page size) suitable for the OS processing, the number of memory chunks specified for gathering write of AsynchronousSocketChannel.write( ) as an asynchronous transmission function provided by the OS is effectively reduced, and the processing efficiency in the OS is improved, as compared with a case where event data of a very small size is held in different chunks. In a case where the OS processes data of the same number of bytes, it is known that internal processing is executed faster when the number of chunks for storage is smaller. For example, a single size such as the page size or a half thereof, more specifically, 1 KB or 2 KB, is adopted as the chunk size. As for the type of the memory block secured for the OS processing, in a case where the direct buffer suitable for the OS processing is used instead of a normal memory (indirect buffer) secured in the heap, the processing efficiency in the OS is further improved. The adoption of the direct buffer is a technology that can be used in combination with the buffer pool and can be used also in a case where memory allocation and release are performed each time without using the buffer pool. However, the technology becomes more suitable for the processing in the OS when used in combination with the buffer pool. Although the suitable use method has been described as an example with the first embodiment in mind, the use method of the present invention is not limited thereto.

The flag management means 107 manages the flag in an atomic manner by means such as compare-and-swap (CAS). Here, the atomic manner refers to an inseparable operation, and specifically refers to a special instruction of the CPU for comparing a content of a certain memory position with a specified value and storing another specified value in the memory position in a case where the content is equal to the specific value with one instruction. The flag management means 107 sets the flag exclusively at a timing when the OS execution means 100 starts the event processing in response to the request from the socket write request means 102*a* (S12 in FIG. 6), and releases the flag at a timing when the even processing is completed (processing by the callback processing means 102*b*) (S23 in FIG. 7). Incidentally, although the flag is released also in S32 in FIG. 8, and the flag is set at the timing when the event processing is started, this is (exception) processing executed in a case where there is no data to be subjected to the event processing. As described above, since the operation illustrated in FIG. 6 is performed, by the function of the flag management means 107, the socket write request means 102a and the callback processing means 102b are controlled in such a way as not to simultaneously execute processing for one socket, and the consistency of a write operation with respect to the socket is guaranteed. In a case where the socket write request means 102a for which the flag is set or the callback processing means 102b corresponding to the socket write request means 102a is executing processing, the second and subsequent calls of the socket write request means 102a cannot set the flag while the flag is set, and thus the processing is interrupted and ends without writing to the OS execution means 100 (S11 in FIG. 6; No). For this reason, although the socket write request means 102a cannot necessarily execute an asynchronous transmission call to the OS for its own event, the socket write request means executes the call in a non-blocking manner and ends the processing without waiting until the event can be transmitted. Even in a case where the socket write request means 102a itself cannot execute the asynchronous transmission call, the socket writing means 102 (the socket write request means 102a or the callback processing means 102b) in execution consequently executes the asynchronous transmission call in the near future. That is, for an event for which the processing by the socket write request means 102a has ended without execution of the asynchronous transmission call, the asynchronous transmission call is made by the socket write request means 102a called later when the transmission buffer is not empty by the socket write request means 102a itself for which the flag is already set and which is exclusively executing the processing or the callback processing means 102b corresponding to the socket write request means 102a, depending on a timing when the event has been accumulated in a first buffer $121b_1$. Note that, as described above, the flag operation surrounded by the dotted line (the checking of the state and the setting in Steps S10, S11, and S12) needs to be performed in an atomic manner in a multi-thread environment in such a way as not to be affected by an interrupt by another thread, and the function of (compare-and-swap) provided by the flag management means 107 is used.

The storage unit 11 stores the OS 110, the communication management program 111, the application 112, and the like that operate the control unit 10 as the respective means 100 to 107 described above. Note that an object to be caused to function as the respective means 100 to 107 may be appropriately switched between the OS 110, the communication management program 111, and the application 112. In addition, a relational database, a file system, or the like is used as the storage unit. Note that, in order to increase the speed, an in-memory database such as Redis may be used or used in combination.

The memory 12 is controlled by the buffering means 106 and other means (not illustrated), and temporarily stores information.

Note that the terminal devices 2a, 2b and 2c each include an operation unit and a display unit in addition to the same configuration as the server device 1. Description is omitted for the common configuration with the server device 1.

(Operation of Information Processing Device)

Next, effects of the first embodiment are described respectively in (1) Basic Operation and (2) Data Transmission Operation.

(1) Basic Operation

As an example, a plurality of users participate in the same virtual space to synchronize a plurality of game objects and share an experience (game play) in the same virtual space (room). The game is progressed by each of the terminal devices 2a, 2b, and 2c, and the server device 1 may perform only the synchronization operation for the objects without progressing the game, or the server device 1 may also progress the game.

Once a participation request for the room is received, participant management means (not illustrated) of the server device 1 records a user ID, a user name, a socket ID, and a participation date and time together in participant management information associated with a room ID of the storage unit 11.

During the play of the game, the terminal devices 2a, 2b, and 2c sequentially generate, update, and delete a plurality of objects (characters, weapons, items, and the like) in accordance with the execution of the application. In a case where the service device 1 progresses the game, the server device 1 receives and processes object operation requests from the terminal devices 2a, 2b, and 2c, and notifies the terminal devices 2a, 2b, and 2c of the processing result, thereby synchronizing the objects. In a case where the server device 1 does not progress the game, the server device 1 performs a relay operation for synchronizing the objects in the terminal devices 2a, 2b, and 2c. In the relay operation, the server device 1 transmits and receives a plurality of objects. In any case, the server device receives, from the terminal devices 2a, 2b, and 2c, information regarding an operation of the plurality of objects operated by the terminal devices 2a, 2b, and 2c, and transmits information regarding of a plurality of object operations corresponding to a synchronization target terminal device. Although the size of each piece of object operation information is small, in each of the terminal devices 2a, 2b, and 2c, frequent data synchronization (at least about 20 to 30 times per second) is required to implement smooth drawing of an object. In a case where the number of synchronization target objects is large in a sophisticated game, and in a case where there are many synchronization target terminal devices as in a MMOG, the number of transmission/reception packets for synchronization processed by the server can be enormous like streaming transmission/reception due to combinatorial explosion. In recent years, although speeding up of a CPU and a memory is remarkable, there are also trends such as physical/distance restrictions, and usage in a mobile device regarding a bandwidth of a network, a throughput with an individual terminal, and a latency, and speeding up is more gradual. Therefore, network transmission and reception tends to have a bottleneck in processing in the server. In the present invention, efficient use of network transmission, a use method in which processing is always executed at the NIC level and free time is as little as possible, in particular, implementation using Java increases the degree of socket utilization at the time of transmission. Hereinafter, details of the transmission/reception operation of the server device 1 will be described.

Figure 3:
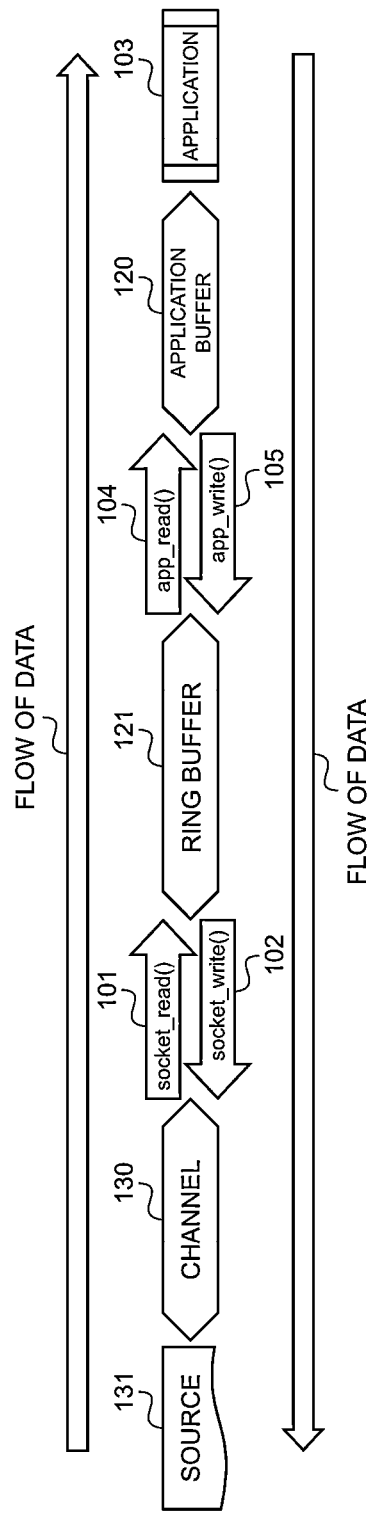
FIG. 3 is a schematic diagram for describing an example of a data transmission/reception operation.

FIG. 3 is a schematic diagram for describing an example of the data transmission/reception operation.

First, when the server device 1 receives data from the network 4, the socket reading means 101 reads data received by a socket corresponding to a channel (a port having a certain IP address corresponding to a reception source terminal device) via a certain channel 130 from a source 131 of the network 4, and writes the data at a position of a write pointer of the reception ring buffer 121a. The data is added to the reception ring buffer 121a. Note that the buffer is separately prepared for each channel or socket. In addition, one channel/socket is prepared for each corresponding terminal device (a specific program to be a communication partner of the terminal device) for both transmission and reception. Although one application buffer is illustrated, the application buffer is actually managed separately for transmission and reception. In addition, the ring buffer is managed as one pool in all channels, and one ring buffer is illustrated. However, the ring buffer 121 is distinguished as a reception ring buffer 121a and a transmission ring buffer 121b for each channel, for management of an independent pointer for each channel and each of transmission and reception.

Next, the application reading means 104 reads data of the reception ring buffer 121a corresponding to the reception source terminal device (channel or socket) from a position of a read pointer, and writes the data to the application buffer 120. The data is retrieved from the reception ring buffer 121a and excluded from the reception ring buffer 121a. Here, the application buffer 120 is independently managed by the application and is not provided by the buffering means 106. The application buffer is provided by another buffering means. For example, the OS function (normal memory allocation and memory release) may provide the application buffer. In order to reuse the memory to improve the efficiency of memory management, another buffering means may be configured to provide a function equivalent to that of the buffering means 106 to provide the application buffer.

The application execution means 103 reads data in the application buffer 120 and processes the data by a thread.

In addition, in a case where the data processed by the thread of the application execution means 103 is transmitted to the network 4, the application execution means 103 writes the data processed by the thread in the application buffer 120.

Next, the application writing means 105 writes the data of the application buffer 120 to the position of the write pointer of a transmission destination terminal device, more precisely, the transmission ring buffer 121b corresponding to the channel or socket, according to the intended transmission destination terminal device. As a result, the data is added to the transmission ring buffer 121b. Once the writing of the data is completed, the write pointer is moved next to a write end position. When the application writing means 105 writes data next time, since the moved write pointer is used, the data to be written next time is added behind the data written this time. Meanwhile, the data of the application buffer 120 becomes unnecessary after being copied to the transmission ring buffer 121, and the application execution means 103 can reuse the buffer area. Note that the transmission ring buffer 121b is prepared for each channel or socket.

Next, the socket writing means 102 reads data from the position of the read pointer of the transmission ring buffer 121b to a position in front of the position of the write pointer, and writes the data to the channel 130 by the socket. The data is transmitted to the source 131 via the channel 130. The read pointer is moved by the number of bytes that have been successfully transmitted and is moved to a position next to the transmitted data. At this time, the data is retrieved from the transmission ring buffer 121b, the OS execution means 100 executes transmission processing as a transmission target, and the transmitted data (all or part of the retrieved data) is excluded from the transmission ring buffer 121b. Data whose transmission has not been completed remains in the transmission ring buffer 121b. Here, all pieces of data accumulated in the transmission ring buffer 121b are transmitted at a time. However, in a case where the data accumulated in the transmission ring buffer 121b becomes huge, control may be performed in such a way that only a part of the data is read and transmitted without reading all the data at a time, for example, in consideration of restriction of an OS transmission function call.

As described above, the ring buffer 121 is a ring buffer that sequentially writes (accumulates) data (events) to (in) a memory area (alternatively, a virtually continuous memory area) and directly stores data to be read, and arranges and stores the stored data in the memory area in order (directly stores data to be managed). The ring buffer 121 does not sequentially store stored pointers for the memory in the memory area (alternatively, a virtually continuous memory area) as write or read pointers (indirectly store data to be managed). In addition, since there is no boundary between write units of data (event) due to writing, the ring buffer 121 needs to separately manage boundary information in a case where it is necessary to execute processing in units of data (event). In the first embodiment, since the data processing (event processing) is network transmission by the OS kernel, the transmission is made as a byte stream regardless of a boundary of the data (event), and thus the boundary of the data (event) does not need to be managed. In addition, in a case where the same effect as that of the first embodiment can be obtained, use of another virtual ring buffer is not hindered.

Hereinafter, a case where data processed by the thread of the application execution means 103 is transmitted from the OS execution means 100 to the network 4 will be described in detail.

(2) Data Transmission Operation

Figure 4:
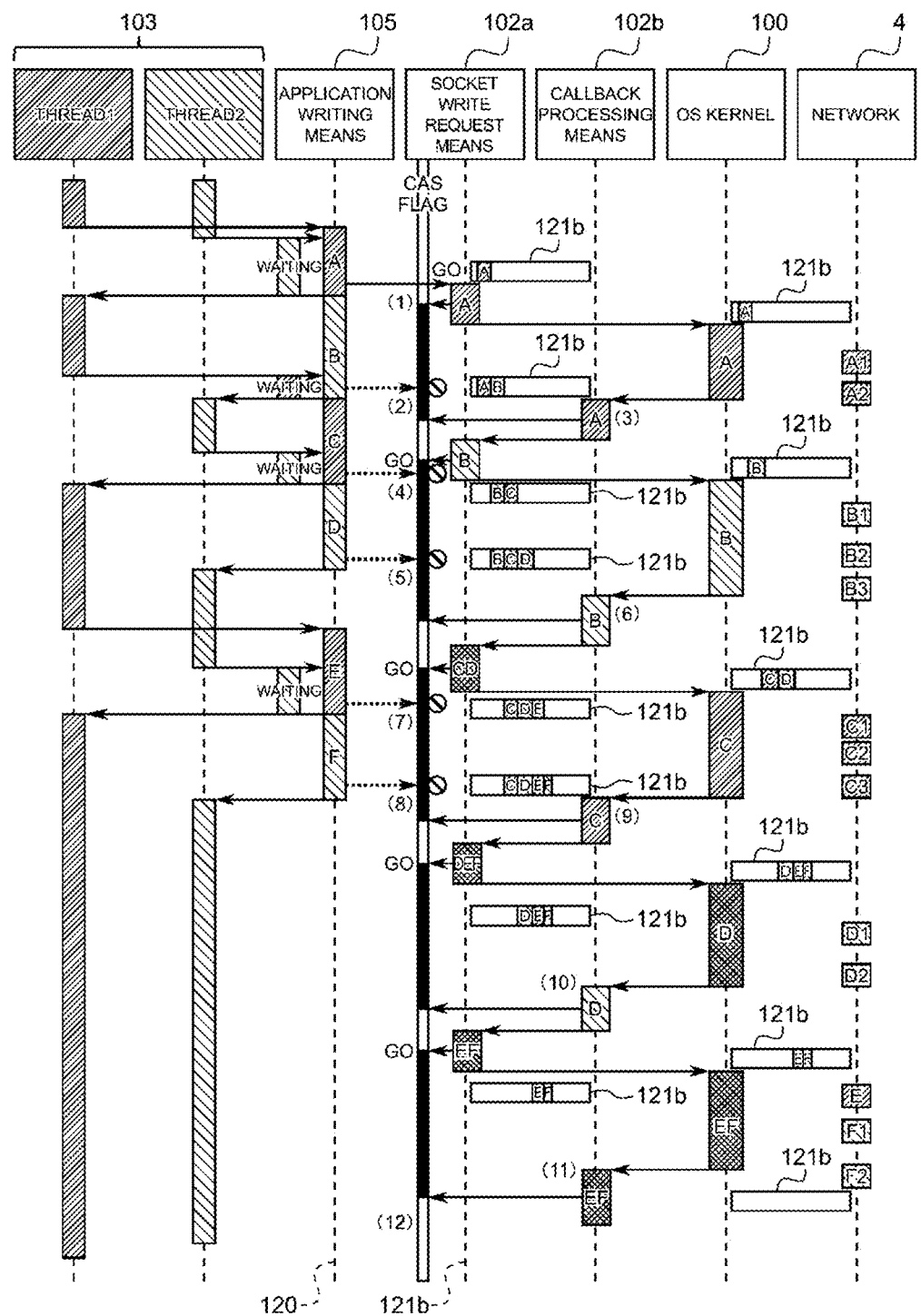
FIG. 4 is a schematic diagram for describing an example of a data transmission operation.

FIG. 4 is a schematic diagram for describing an example of the data transmission operation.

For example, in order to process data by a plurality of threads 1 and 2 and transmit data A and data B as processing results to the same terminal device (more precisely, the same socket or channel), the application execution means 103 performs writing to the transmission ring buffer 121b corresponding to a socket that communicates with the transmission destination terminal by the application writing means 105. In order to transmit to a plurality of channels, each means of the present invention is required for each channel. It is assumed that the processing by the thread 1 and the processing by the thread 2 occur asynchronously in a multi-thread environment. The application writing means 105 performs blocking control in such a way as to write at most one of the data A and the data B for each channel, and causes processing of writing the data B of the thread 2 to wait while the application writing means 105 writes the data A of the thread 1 to the transmission ring buffer 121b. Similarly, while the application writing means 105 writes the data B of the thread 2 to the transmission ring buffer 121b, processing of writing data C of the thread 1 waits. Writing to the transmission ring buffer 121b starts from the position of the write pointer, and at the end of writing, the write pointer is moved next to the write end position. Here, in order to simplify the description, in a case where a non-blocking buffer is adopted as the transmission buffer 106b that performs blocking control in such a way that write operations between threads are not mixed in the transmission ring buffer 121b, the application writing means 105 functions more efficiently. That is, the write pointer and the read pointer of the transmission ring buffer 121b are exclusively operated by a thread for writing (the application writing means 105) and a thread for reading (the socket writing means 102), at most one of the threads being active at a certain time. Therefore, the writing (the application writing means 105) and the reading (the socket writing means 102) can be asynchronously performed in a non-blocking manner.

Next, the socket write request means 102*a* refers to a CAS flag of the flag management means 107. In a case where the flag is not set, the socket write request means 102*a* sets the flag, executes an OS system call (AsynchronousSocketChannel.write( ) of JAVA, for example), and transmits the data accumulated in the transmission ring buffer 121*b* (data from the position of the read pointer to a position right in front of the write pointer at a calling time point). At this time, only the data A is accumulated in the transmission ring buffer 121*b*. The socket write request means 102*a* requests the OS execution means 100 (OS kernel) to write the data A to the transmission ring buffer 121 and ends the processing (1).

Next, the OS kernel 100 determines the data A according to an appropriate size (the size is, for example, a network dependent maximum transmittable packet size (maximum transmission unit (MTU)) (the MTU is 1500 bytes for Ethernet) and various protocol headers. Typically, in a case of TCP/IP in Ethernet, the data is divided into a maximum segment size (MSS) of 1460 bytes obtained by subtracting 20 bytes of a TCP header and 20 bytes of an IP header and transmitted to the network 4 as data A1 and data A2. When the data B is written by the application writing means 105 to the transmission ring buffer 121*b* during the event processing by the OS kernel 100, the transmission ring buffer 121*b* accumulates the data B in a non-blocking manner even while the OS kernel 100 is performing the reading processing. The application writing means 105 continues to call the socket write request means 102*a*, but since the socket write request means 102*a* is processing the data A and the CAS flag of the flag management means 107 is set, the socket write request means 102*a* does not execute the transmission processing of the data B and immediately ends processing in a non-blocking manner (2). The thread 2 can execute the next processing without waiting for completion of network transmission processing (the event processing by the OS kernel 100) that takes relatively long time. At this point, the data B is added to the transmission ring buffer 121*b*, and the data A and the data B exist.

Next, when the transmission of the data A is completed, the OS kernel 100 activates the callback processing means 102*b* and makes a notification of the completion of the transmission. The callback processing means 102*b* checks the number of bytes whose transmission is completed, and in this case, since the transmission of the entire data A is completed, the read pointer of the transmission ring buffer 121*b* is moved to a position right behind the data A, and the data A is excluded from the transmission ring buffer 121*b*. Next, the callback processing means 102*b* releases the CAS flag of the flag management means 107. At this point, in the transmission ring buffer 121*b*, the data A is excluded, and only the data B exists. Next, the callback processing means 102*b* determines whether or not there is still data to be transmitted to the transmission ring buffer 121*b* (in a case where the read pointer and the write pointer match, there is no data to be transmitted). In a case where there is data to be transmitted, the socket write request means 102*a* is called. In a case where there is no data to be transmitted, the processing ends. In this case, since the data B already exists in the transmission ring buffer 121*b*, the socket write request means 102*a* is called (3).

Next, the socket write request means 102*a* makes a request to the flag management means 107 to refer to the CAS flag. Since the flag is not set, the socket write request means 102*a* sets the flag, executes an OS system call (AsynchronousSocketChannel.write( ), and transmits the data accumulated in the transmission ring buffer 121*b* (data from the position of the read pointer to a position right in front of the write pointer at a calling time point). At this time, only the data B is accumulated in the transmission ring buffer 121*b*. The socket write request means 102*a* requests the OS kernel 100 to write the data B to the transmission ring buffer 121*b*, and ends the processing.

Next, the OS kernel 100 divides the data B into appropriate sizes and transmits the data B as data B1, data B2, and data B3 to the network 4. When the data C is written by the application writing means 105 to the transmission ring buffer 121*b* during the event processing by the OS kernel 100, the transmission ring buffer 121*b* accumulates the data C in a non-blocking manner, and calls the socket write request means 102*a*. However, since the socket writing means 102 is processing the previous data B for which the request has been made by the socket write request means 102*a* to the OS, and the CAS flag of the flag management means 107 is set, the socket write request means 102*a* immediately ends the processing without requesting the OS kernel 100 to execute transmission processing for the data C (4). Similarly, when data D is written by the application writing means 105 to the ring buffer 121, the ring buffer 121 accumulates the data D in a non-blocking manner, and calls the socket write request means 102*a*. However, since the socket writing means 102 is processing the data B, and the CAS flag of the flag management means 107 is set, the socket write request means 102*a* immediately ends the processing without performing transmission processing for the data D (5). At this time point, the data B, the data C, and the data D are sequentially accumulated in the transmission ring buffer 121*b*.

Next, when the transmission of the data B is completed, the OS kernel 100 activates the callback processing means 102*b* and makes a notification of the completion of the transmission. The callback processing means 102*b* first confirms that the number of transmission completion bytes corresponds to the entire data B, and then moves the read pointer of the transmission ring buffer 121*b* to a position next to the data B (in this case, the head of the data C). At this point, the data B is excluded from the transmission ring buffer 121*b*, and the data C and the data D are accumulated in the transmission ring buffer 121*b*. Next, the callback processing means 102*b* releases the CAS flag of the flag management means 107, and then, confirms that the transmission ring buffer 121*b* is not empty (in this case, the data C and the data D are accumulated), and calls the socket write request means 102*a*.

Next, the socket write request means 102*a* refers to the CAS flag of the flag management means 107. Since the flag is not set, the socket write request means 102*a* sets the flag, executes an OS system call (AsynchronousSocketChannel.write( ), and writes the data C and the data D of the transmission ring buffer 121*b* to the OS kernel 100 (6).

Next, the OS kernel 100 divides the data C and the data D into appropriate sizes and transmits data C1, data C2, data C3, and the like to the network 4. When data E is written by the application writing means 105 to the transmission ring buffer 121*b* during the event processing by the OS kernel 100, the transmission ring buffer 121*b* accumulates the data E in a non-blocking manner, but since the CAS flag of the flag management means 107 is set for the call of the socket write request means 102*a*, the socket write request means 102*a* ends the processing without executing the transmission processing for the data E (7). Similarly, when data F is written by the application writing means 105 to the transmission ring buffer 121*b*, the transmission ring buffer 121*b* accumulates the data F in a non-blocking manner (8). At this point, the transmission ring buffer 121*b* accumulates the data C, the data D, the data E, and the data F.

Next, when the transmission of the data C is completed, the OS kernel 100 activates the callback processing means 102*b* and makes a notification of the completion of the transmission without executing the processing for D by chance this time. In general, the OS system call (AsynchronousSocketChannel.write( )) does not necessarily ensure that transmission of all requested data is completed. Only a part of requested data may be transmitted due to a load of the OS or network. Therefore, it is essential to confirm the number of bytes whose transmission is completed. In addition, this system call provides a gathering write function of collectively sending a plurality of buffers (memory chunks) with one system call by specifying the buffers. Therefore, a request for transmission of C and D can be made with one system call even in a case of two or more memory chunks instead of a single continuous memory chunk. In this example, although a notification of the end of the transmission of the entire data C is made by chance, the data C and the data D are continuous gathered transmission target data for the OS kernel 100, and the OS kernel 100 does not distinguish whether or not the pieces of data are different data. Therefore, the complete transmission of the data C is a coincidence, and the transmission of the data C may end while leaving a part of the data C. Since a plurality of memory chunks can be specified in gathering transmission, a plurality of memory chunks may be specified for each of C and D, one memory chunk in which C and D are gathered may be specified, or a plurality of memory chunks (for example, three memory chunks such as the first half of C, the second half of C and the first half of D, and the second half of D) in which C and D are partially mixed may be specified for C and D. Meanwhile, in the gathering transmission in the OS, the specified chunks are sequentially transmitted. However, due to circumstances of the OS, all the specified chunks may be transmitted, or only some of the specified chunks may be transmitted. Here, some chunks may be all of some chunks of a plurality of chunks, or only the head portion of the last chunk may be transmitted, and there may be an untransmitted chunk. Not all the bytes included in a chunk specified for transmission are successfully transmitted, and it is necessary to check the number of bytes successfully transmitted by a callback routine and set an untransmitted chunk or a part of the chunk as a target of the next gathering transmission (for example, there may be a case where the transmission of C1 and C2 is completed and C3 is left, or a case where the transmission of C1, C2, and the first half of C3 is completed, and the second half of C3 is left). The callback processing means 102*b* first checks the number of bytes whose transmission is completed, and in this case, since only the data C is completely transmitted, the read pointer of the transmission ring buffer 121*b* is moved to a position next to the data C (in this case, the head position of the data D). At this point, the data C is excluded from the transmission ring buffer 121*b*, but the data E and the data F are added during the transmission processing for the data C, and thus, the transmission ring buffer 121*b* accumulates the data D, the data E, and the data F. Next, the callback processing means 102*b* releases the CAS flag of the flag management means 107. In this case, since data to be transmitted (in this case, the data D, data E, and data F) exists in the transmission ring buffer 121*b*, the callback processing means 102*b* calls the socket write request means 102*a*.

Next, the socket write request means 102*a* refers to the CAS flag of the flag management means 107. Since the flag is not set, the socket write request means 102*a* sets the flag and executes an OS system call (AsynchronousSocketChannel.write( )), and requests writing of all the data D, data E, and data F of the transmission ring buffer 121*b* to the OS kernel 100 (9).

Next, the OS kernel 100 divides the data D, data E, and data F into appropriate sizes and transmits data D1, data D2, and the like to the network 4.

Next, when the transmission of only the data D is completed by chance, the OS kernel 100 activates the callback processing means 102*b* and makes a notification of the completion of the transmission. When the number of transmitted bytes is checked, since only the data D has been completely transmitted by chance, the callback processing means 102*b* moves the read pointer of the transmission ring buffer 121*b* to the head of the data E, releases the CAS flag of the flag management means 107, and calls the socket write request means 102*a* since the transmission ring buffer is not empty.

Next, the socket write request means 102*a* refers to the CAS flag of the flag management means 107. Since the flag is not set, the socket write request means 102*a* sets the flag, executes an OS system call (AsynchronousSocketChannel.write( )), and requests writing of the data E and the data F of the ring buffer 121 to the OS kernel 100 (10).

Next, the OS kernel 100 divides the data E and the data F into appropriate sizes and transmits data E, data F1, and data F2 to the network 4.

Next, when the data E and the data F are transmitted, the OS kernel 100 activates the callback processing means 102*b* and makes a notification of the completion of transmission. The callback processing means 102*b* checks the number of transmitted bytes, moves the read pointer of the transmission ring buffer 121*b* to a position next to the data F, and releases the CAS flag of the flag management means 107. The transmission ring buffer 121*b* becomes empty (the read pointer and the write pointer match), and the callback processing means 102*b* ends the processing.

In the above example, for ease of description, the pieces of data A to F are illustrated as large data transmitted as one or more network packets. When the game server transmits and receives the synchronization information for an object like streaming, the size of each piece of data is very small compared to a transmission packet size of the network, and in a case where the data is accumulated, a large number of pieces of data are transmitted as one network transmission packet. Therefore, the non-blocking socket writing means by the CAS has significantly less overhead than a case of using the lock function of the OS and can efficiently operate a transmission channel without interruption by arranging a plurality of pieces of data collectively in a continuous block or transmitting a plurality of pieces of data collectively with one OS transmission request, and thus, is particularly useful in a use form such as streaming.

Effects of First Embodiment

According to the above-described embodiment, the transmission ring buffer 121*b* is provided between the application writing means 105 and the socket writing means 102, the transmission ring buffer 121*b* accumulates write data of the application writing means 105 in a non-blocking manner, a write operation of the socket write request means 102*a* is performed according to the CAS flag, the CAS flag is managed by the flag management means 107, the flag is set at the start of writing by the socket write request means 102*a*, and the flag is released by the callback processing means 102b that has received the notification of the completion of the event processing by the OS execution means 100. Therefore, the write operation of the application writing means 105 does not directly affect the operation of the transmission event processing by the OS execution means 100 (there is no waiting time for the application writing means 105 and the OS execution means 100, and the number of calls is reduced), and the application processing and the data transmission can be executed in a non-blocking manner to increase a communication speed. In particular, by executing processing of performing transmission to the network requiring a relatively long processing time as, if possible, continuous processing in a non-blocking manner with a short waiting time (latency), it is possible to prioritize the network transmission processing, increase the transmission throughput, and execute the application processing in a time period while waiting for asynchronous transmission (NIO) processing.

In addition, OS resources (a total memory amount, the number of threads, and the number of OS function calls) consumed by the application can be reduced, and the processing speed can be increased. In addition, in a case of operating with a rental server, a cloud service, or the like, it is possible to operate with a more compact server specification, and the operation cost is reduced.

Second Embodiment

A second embodiment is different from the first embodiment in that there are two types of intermediate buffers as transmission buffers and the application writing means 105 performs processing in a non-blocking manner at the time of multi-threading. The application writing means 105 can perform parallel processing in a non-blocking manner, and the processing efficiency of the application is improved as compared with the first embodiment. Note that a description of configurations and operations common to the first embodiment may be omitted. First, since a configuration of a communication management system and a configuration of a server device according to the second embodiment are the same as those in FIGS. 1 and 2 according to the first embodiment, a description thereof is omitted. The operations and functions specialized in the first embodiment in the description of FIGS. 1 and 2 will be described below including differences from the first embodiment.

Figure 9:
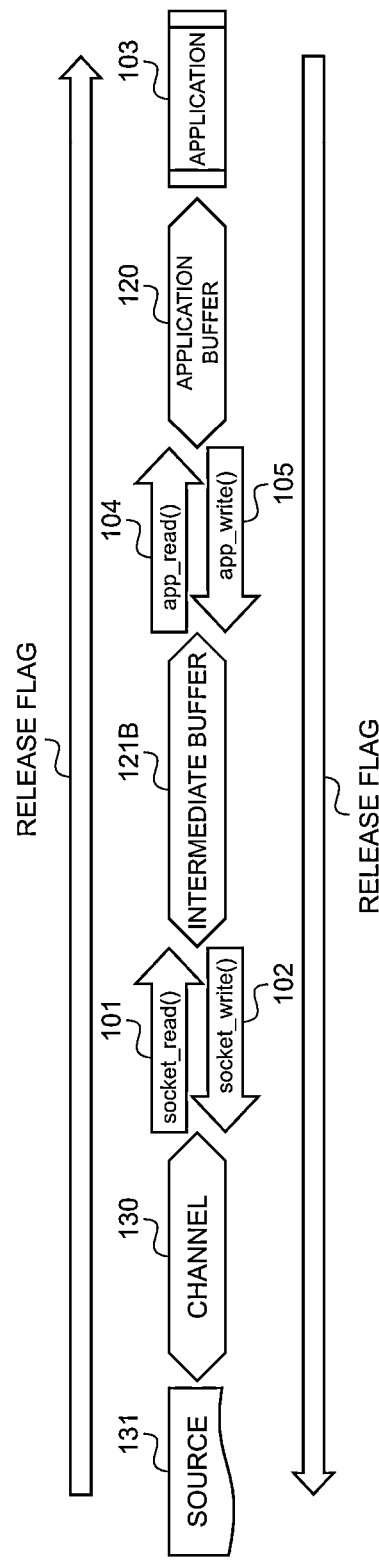
FIG. 9 is a schematic diagram for describing another example of the data transmission/reception operation.
Figure 10:
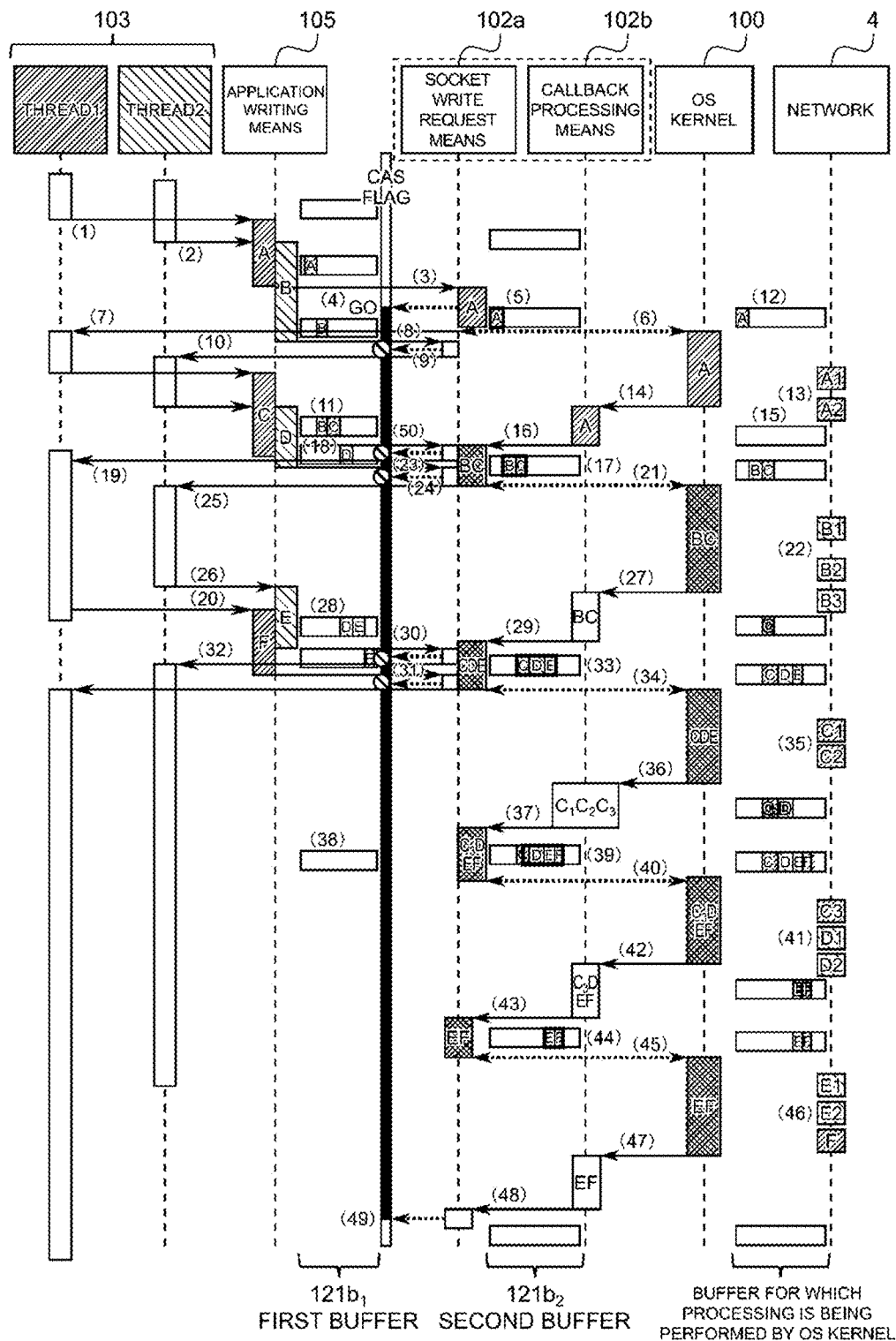
FIG. 10 is a schematic diagram illustrating another example of the data transmission operation.

As illustrated in FIGS. 9 and 10, the configuration according to the second embodiment is different from the configuration according to the first embodiment (FIGS. 3 and 4) in that the ring buffer 121 (see FIG. 3) is replaced with an intermediate buffer 121B (see FIG. 9), and the buffering means 106 prepares not only the ring buffer 121b (see FIG. 4) but also the first buffer $121b_1$ and a second buffer $121b_2$ as transmission buffers in the memory 12 (see FIG. 10).

As illustrated in FIG. 10, the first buffer $121b_1$ receives writing of an event generated as a result of processing of a thread 103 by the application writing means 105, and the second buffer $121b_2$ receives writing of a set of data written for each thread in the first buffer $121b_1$ by the socket writing means 102a. In a case where an event is held in a standardized memory chunk, in the first buffer $121b_1$, as an example, a standard event size is considered, and a chunk size is calculated and designed using various existing optimization algorithms and the like in such a way that a chunk is not left unused when the event is stored in a chunk, and here, a plurality of events are held in a 256 byte standardized chunk (held in a plurality of chunks when the event size is larger than 256 bytes). Assuming that the chunk is managed by the buffer pool and the buffer pool is shared by a plurality of channels, when 4096 chunks are prepared as initial values, the total is 1 MB. It is desirable that extension can be made by additionally allocating a memory chunk in a case where the buffer pool is insufficient. In addition, here, in sharing the buffer pool by a plurality of channels, different channels and different sockets are used for each different transmission destination. Therefore, the present invention mainly describes the operation of a single channel. However, each of other channels similarly holds the independent buffering means 106. In a case where the buffer pool that provides memory chunks to each buffering means is centrally managed, it is possible to eliminate duplication of memory reservation of the buffer pool and to interchange memories between the channels unlike a case where the buffer pool is individually held in each channel. Therefore, it is possible to save a total memory to be secured as the buffer pool. Meanwhile, the second buffer $121b_2$ is used for event processing in the OS. As an example, it is assumed that the second buffer $121b_2$ holds transmission data to be processed in a 2048-byte standardized chunk in consideration of a page size which is a suitable data processing size of the OS. Assuming that the chunk is managed by the buffer pool and the buffer pool is shared by a plurality of channels, when 4096 chunks are prepared as initial values, the total is 8 MB. Similarly to the buffer pool of the first buffer $121b_1$, it is desirable that extension can be made by additionally allocating a memory chunk in a case where the buffer pool is insufficient. Note that a chunk capacity and the number of chunks of each of the first buffer $121b_1$ and the second buffer $121b_2$ are appropriately set according to a communication environment and a specification of the system, and thus are not limited to the values illustrated as examples. However, since a large memory acquired in advance is divided to use the memory chunks of the buffer pool, it is desirable to select the size of the memory chunk from the page size of the server device 1 and 1/perfect power of 2 of the page size in consideration of the memory boundary in terms of efficiency of the memory system, and any number of bytes such as 50 bytes or 100 bytes need not be selected. When the direct buffer suitable for processing in the OS is used as the second buffer, transmission processing efficiency in the OS is improved.

Figure 11:
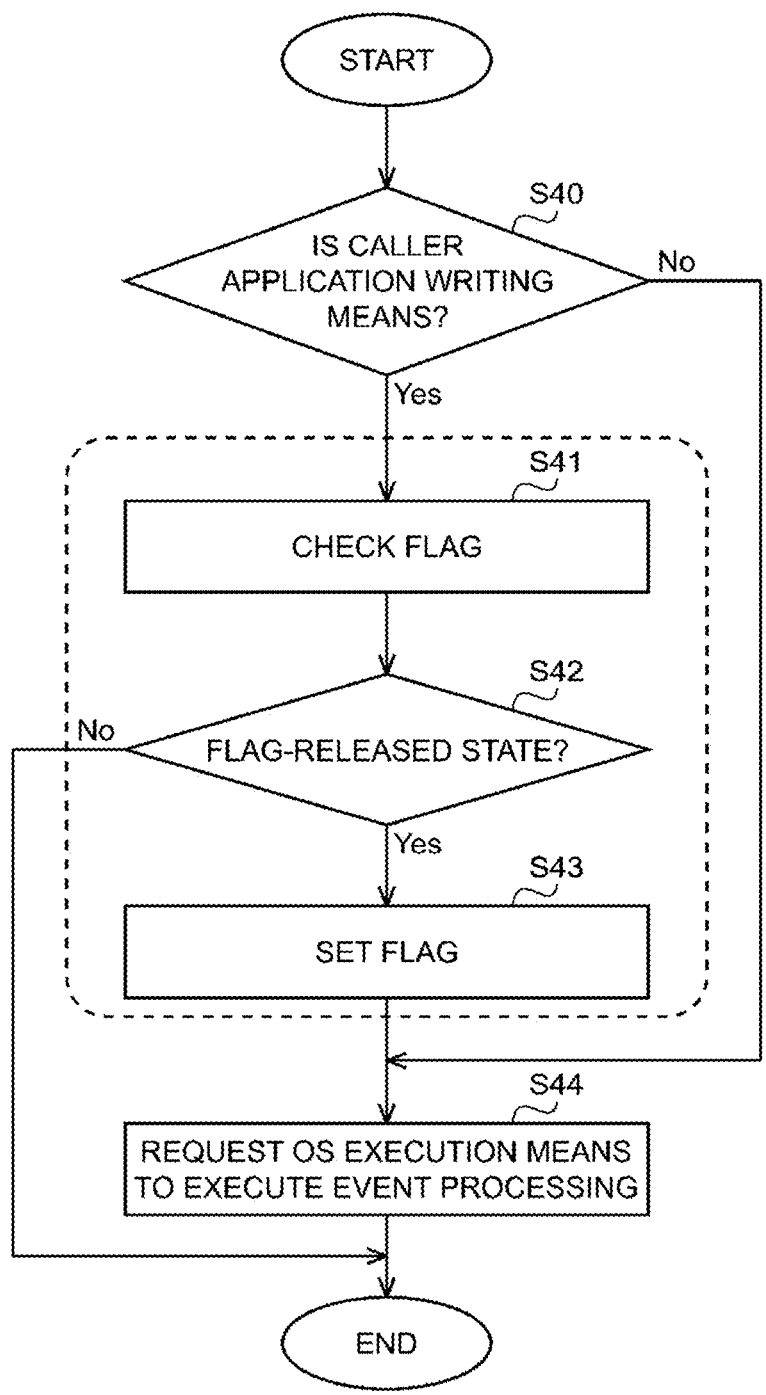
FIG. 11 is a flowchart for describing another operation example of the socket write request means.
Figure 12:
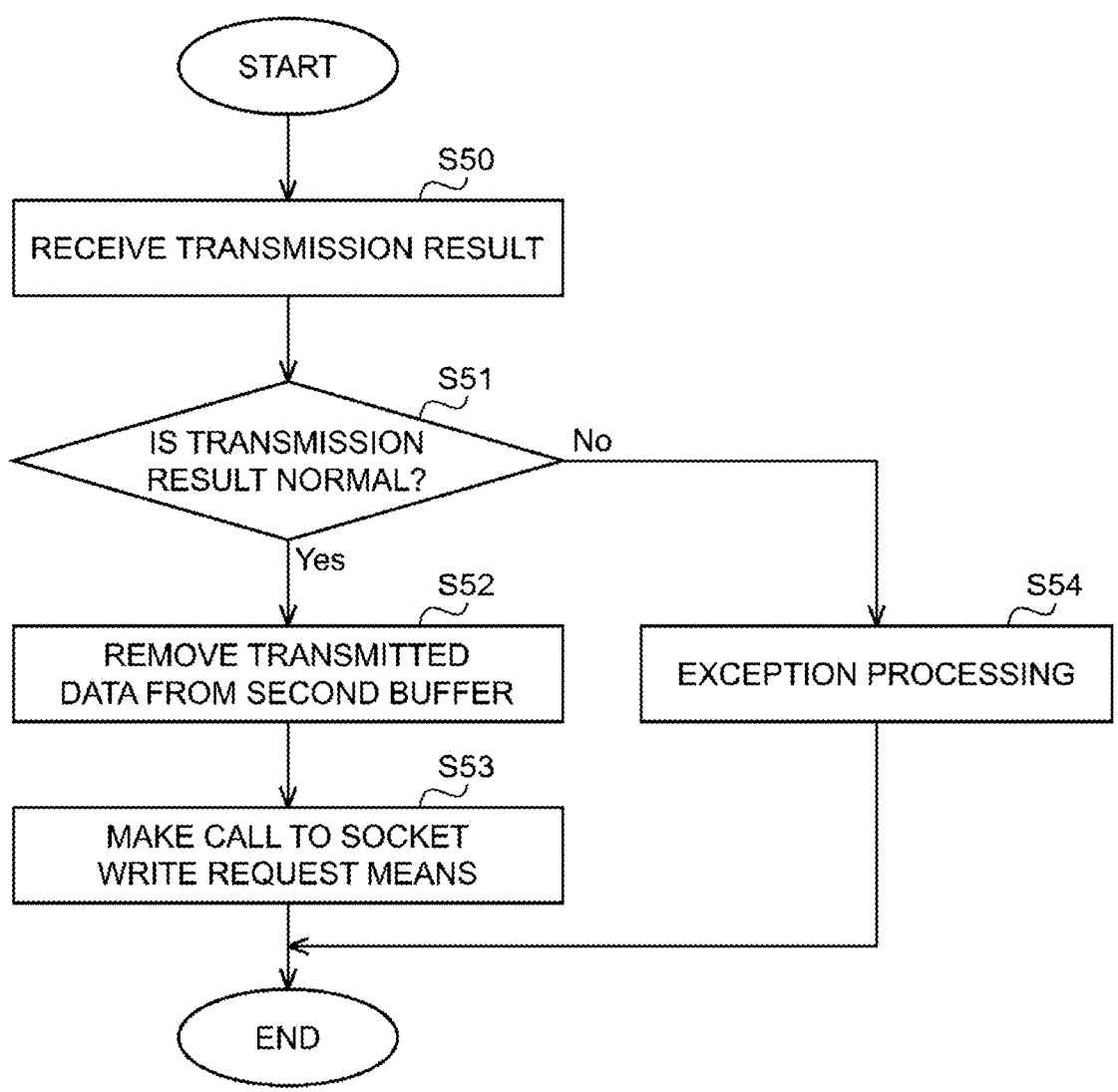
FIG. 12 is a flowchart for describing another operation example of the callback processing means.
Figure 13:
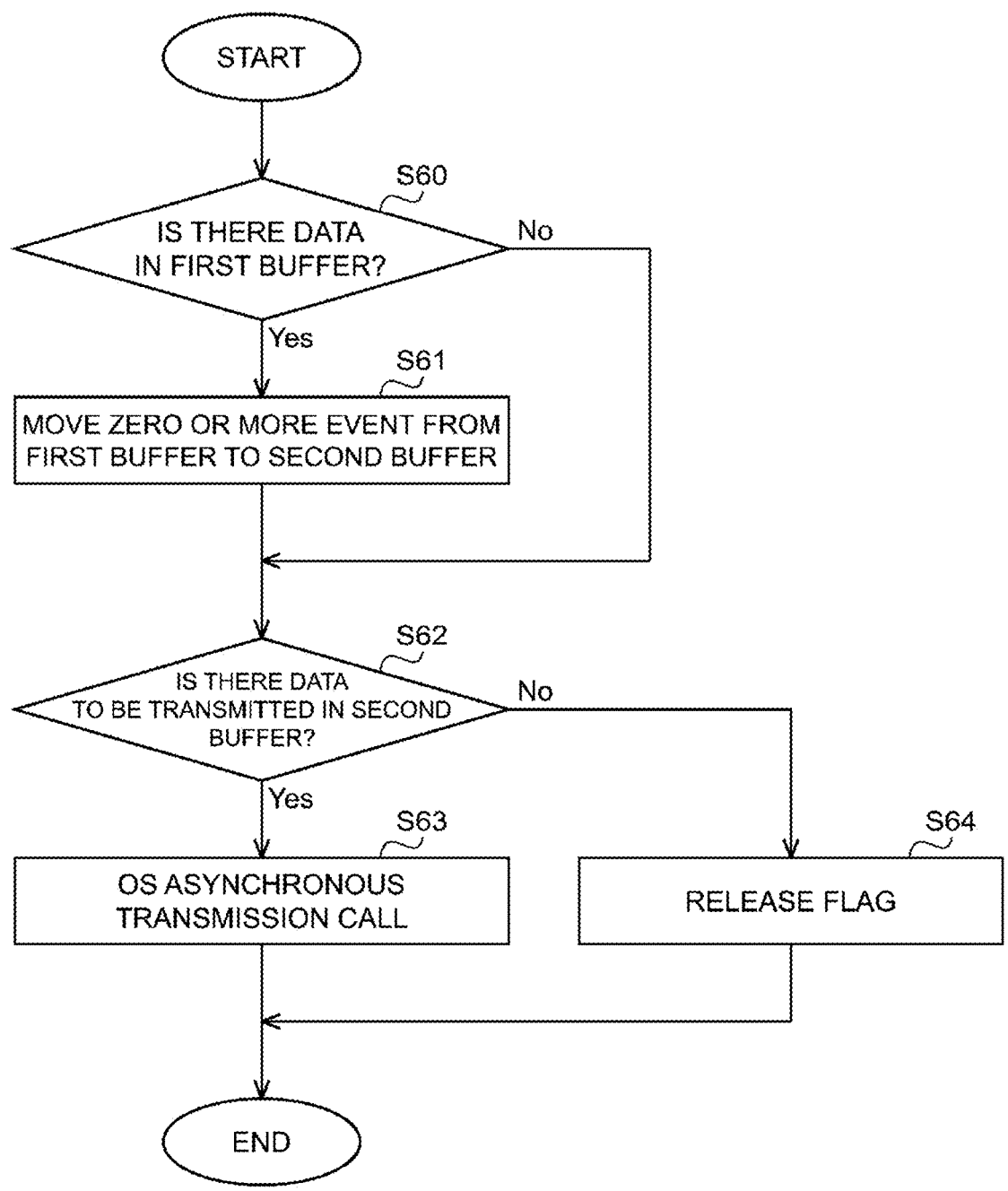
FIG. 13 is a flowchart for describing another operation example of the socket write request means.

As illustrated in FIGS. 11, 12, and 13, the second embodiment is different from the first embodiment in that the socket writing means 102 as processing means, the socket write request means 102a and the callback processing means 102b as processing request means operate differently from those of the first embodiment in the usage of the flag management means 107 (FIGS. 6, 7, and 9). Operations of the socket write request means 102a and the callback processing means 102b will be described below. This is because, in the second embodiment, since the application writing means 105 can perform parallel processing in a non-blocking manner, the change of the flag management means 107 is ended by simple processing of writing the event in the intermediate buffer 121B without calling the socket write request means by the application writing means 105 only while the application writing means 105 is executed continuously and frequently. Instead, while the application writing means 105 is executed continuously and frequently, the callback processing means of the socket writing means 102 that is already being executed continuously calls the socket writing means until there is no event held by the intermediate buffer 121B. As a result, an average processing speed of the application writing means 105 is shortened, and the efficiency of the parallel processing by the thread 103 of the application is improved. Note that it is possible to apply, also in the first embodiment a method of using the flag management means 107 (the operations of the socket write request means 102a and the callback processing means 102b) that places emphasis on the parallel operation efficiency of a transmission thread of the application described in the second embodiment. Conversely, it is also possible to apply, also in the second example, a method of using the flag management means 107 (the operations of the socket write request means 102a and the callback processing means 102b) that places emphasis on the transmission processing efficiency of the OS described in the first embodiment. Meanwhile, the flag management method is not limited to the two types of methods, and another method for asynchronously executing event addition and event processing in a non-blocking manner may be used.

FIGS. 11 and 13 are flowcharts for describing an operation example of the socket write request means 102a. FIG. 12 is a flowchart for describing an operation example of the callback processing means 102b.

First, as illustrated in FIG. 11, the socket write request means 102a checks a caller (S40), and in a case where the caller is the application writing means 105 (a call after addition of the event to the first buffer) (S40; Yes), the socket write request means 102a requests the flag management means 107 to check the state of the flag managed by the flag management means 107 (S41), and in a case where the flag is in a released state (S42; Yes), and the flag is set (S43). The socket write request means 102a is called asynchronously immediately before the application writing means 105 ends processing of writing an event to the ring buffer 121b or immediately before the corresponding callback processing means 102b executed after the end of the socket write request means 102a ends. The call may be a call of a normal method or function, or may be startup by signaling to a standby thread using an OS function. Only in the former case, the flag management means is used to determine whether or not the OS execution means can be requested to execute the event processing. In the latter case, since the flag is already set and then the event processing is being executed by the OS execution means one or more times, the OS execution means is requested to execute the event processing without setting the flag again. The simplest way to make a notification to the caller is to include a caller identifier in a calling parameter, but any other way may be used. In a case where the flag is set in the former case, the socket write request means 102a then requests the OS execution means 100 to execute the event processing (S44). On the other hand, in the former case, in a case where the flag managed by the flag management means 107 is already set (Step S42; No), the processing immediately ends. Further, in the latter case, that is, in a case where the caller is not the application writing means 105 but the callback processing means 102b (Step S40; No), since the flag is already set at the time of immediately previous execution of the socket write request means 102a corresponding to the execution of the callback processing means 102b, the socket write request means 102a request the OS execution means 100 to execute the event processing regardless of the state of the flag (S44). Note that, as described above, similarly to FIG. 6, the flag operation surrounded by the dotted line (the checking of the state and the setting in Steps S41, S42, and S43) needs to be performed in an atomic manner in a multi-thread environment in such a way as not to be affected by an interrupt by another thread, and the function of (compare-and-swap) provided by the flag management means 107 is used.

FIG. 13 illustrates the operation of the OS execution means 100. In Step S44 (FIG. 11), the socket write request means 102a checks whether or not there is data to be transmitted in the first buffer $121b_1$ (S60), and in a case where there is data to be transmitted (S60; Yes), the event in the first buffer $121b_1$ is moved to the second buffer $121b_2$ as necessary (S61). In a case of simply moving, this step may be omitted, and it is sufficient if an OS asynchronous transmission call S63 is executed suddenly for the data of the first buffer, and the processing efficiency is improved by omitting the movement. Since the movement is performed, an operation that is expected to improve some performance in the movement operation, for example, a change in memory type of the buffer, a change in memory size of the buffer, a change in data arrangement in the buffer, and control of the number of movements (the number of moved events or the number of moved bytes) are performed, and the event held in the memory chunk of the first buffer is copied to a newly allocated memory chunk of the second buffer, and the unnecessary memory block of the first buffer after the copying ends is released.

Note that the efficiency in allocation and release of memory blocks held by the buffer is improved when the buffer pool is used. In the following various variations, it is assumed that the buffer pool is used, and the description is provided with a buffer using memory chunks of a standardized size in mind. However, the present invention is not limited to all or some of the operations, and the following various variations and other useful operations are not excluded even in a case where the memory chunks are normally allocated and released each time or even in a case where the sizes of chunks are different.

First, since the OS uses the second buffer in the processing (S63) as described later, it is preferable to use the direct buffer suitable for the processing by the OS as the type of the memory chunk.

Next, the size of the buffer and the arrangement of data will be described. It is more efficient for the OS to process data with one large memory chunk than to process many small chunks. Therefore, it is preferable to reduce the number of memory chunks processed by the OS by preparing a large memory chunk and arranging a plurality of events in order in one memory chunk.

Next, the movement will be described. At the timing of the movement, all the events held by the first buffer $121b_1$ may be simply moved to the second buffer $121b_2$. However, considering that the direct buffer used for the OS processing is used as the second buffer and that there is an upper limit to the number of memory chunks and the total number of bytes that can be processed by the OS processing request at a time, in order to suppress the usage of the direct buffer, the number of events to be moved may be controlled in such a way that the number of memory chunks held by the second buffer that receives the events is equal to or less than an appropriate number for the OS processing request. For example, an upper limit such as about 32 is set for the number of memory chunks of the direct buffer held by the second buffer, and in a case where the second buffer already holds a considerable number of memory chunks (in this example, nearly 32 memory chunks) due to a delay in the processing by the OS or the like, the movement is stopped within the upper limit range (in this example, a predetermined upper limit value such as 32 or 33), or in a case where the upper limit is already exceeded, the movement is not performed (no movement is performed). As described above, by setting a limit such as an upper limit to the number of memory chunks held by the second buffer $121b_2$, an event that is delayed due to communication failure or the like is accumulated in the first buffer $121b_1$, and the second buffer $121b_2$ that uses a direct buffer resource shared by the entire server device 1 is not enlarged. Conversely, in a desirable state where there are few chunks held by the second buffer, all events in the first buffer $121b_1$ can be moved.

The movement of the event from the first buffer $121b_1$ to the second buffer $121b_2$ is performed in order to improve the event processing efficiency in the OS at the subsequent stage by performing all or some of such a change in type of memory chunk, a change in size of the memory chunk, a change in data arrangement in the memory chunk, control of the number of movements, or other methods for improving the performance.

Although the example in which the number of buffers is two (the first buffer $121b_1$ and the second buffer $121b_2$) has been described above, the number of buffers is not limited to two. It is not necessary to perform all the change in type of memory chunk, the change in size of the memory chunk, the change in data arrangement in the memory chunk, and the control of the number of movements, or perform other method for improving performance in one movement between the two buffers, and these may be sequentially performed in multiple stages using three or more buffers.

In addition, although the example of movement in units of events has been described, the movement is not limited to the units of events. In a case where the OS processing system such as network transmission performs processing in units of accumulated bytes regardless of the boundary of individual events, the movement of events between the buffers is not limited to an event unit (zero or more events). Only a part of a certain event may be moved, or a combination of parts of consecutive events (for example, a combination of a part of the second half of an event A (the remaining second half of the event A), an entire event B, and a part of the first half of an event C after the first half of the event A is moved when the event A, the event B, and the event C are accumulated in order) may be moved.

Further, in a case where there is no data to be transmitted in the first buffer $121b_1$ (S60; No), the processing proceeds to Step S62.

Note that the application writing means 105 adds the event to the first buffer $121b_1$. After adding the event to the first buffer $121b_1$ (FIG. 10), the application writing means 105 calls the socket write request means 102a. The application writing means 105 is called asynchronously from the plurality of threads 103 operating in parallel, and accumulates the event in the first buffer $121b_1$ in a non-blocking manner. As the buffer, for example, a queue (java.util.concurrent.ConcurrentLinkedQueue) provided by Java is used as a FIFO buffer that manages the pointer to the memory chunk. By reusing the memory chunk managed by the buffer pool, a ring buffer with high efficiency can be implemented. The memory chunk of the buffer pool may be standardized with a memory size slightly larger than a typical event size. An event that is too large to be held in the memory chunk is stored in a plurality of chunks. The chunk size is adjusted to be 1/perfect power of 2 of the page size. Similarly to the first buffer $121b_1$, the second buffer $121b_2$ can also use a FIFO queue (for example, java.util.concurrent.ConcurrentLinkedQueue) that holds the pointer to the memory chunk that stores event information.

Next, in a case where there is data to be transmitted in the second buffer $121b_2$ (S62; Yes), the socket write request means 102a makes an OS asynchronous transmission request to the OS execution means 100 to request the event processing (S63). For example, gathering write of AsynchronousSocketChannel.write( ) in Java is called to request processing of a plurality of events with one call with a plurality of memory chunks as transmission targets. Further, in a case where there is no data to be transmitted in the second buffer $121b_2$ (S62; No), the socket write request means 102a requests the flag management means 107 to release the flag (S64). After confirming that there is no data in the first buffer $121b_1$ (S60), it is confirmed that there is no data in the second buffer $121b_2$ (S62), and thus, it is regarded that all pieces of data held by the intermediate buffer 121B (the first buffer $121b_1$ and the second buffer $121b_2$) have been completely transmitted, and the flag is released, and the OS asynchronous transmission call that has been continuously executed a plurality of times in a state in which the flag is set in some cases ends. In a case where an event is added to the first buffer $121b_1$ until the flag is released after it is regarded that the transmission is completed, the OS processing is executed together with the next event.

When the OS execution means 100 has completed processing of a write event by the socket write request means 102a, the callback processing means 102b illustrated in FIG. 12 receives a completion notification from the OS execution means 100 and executes processing asynchronously with the corresponding socket write request means 102a. The callback processing means 102b receives a network transmission result of the OS execution means 100 (S50). In a case where the transmission result is normal (S51; Yes), the callback processing means 102b deletes the transmitted data from the second buffer $121b_2$ (S52), and calls the socket write request means 102a (S53). In a case where the transmission result is abnormal (S51; No), the callback processing means 102b executes exception processing (disconnecting connection or the like) such as communication interruption and timeout (S54).

(Operation of Information Processing Device)

Effects of the second embodiment are described respectively in (1) Basic Operation and (2) Data Transmission Operation.

FIG. 9 is a schematic diagram for describing an example of data transmission/reception operation according to the second embodiment.

(1) Basic Operation

First, when the server device 1 receives data from the network 4, the socket reading means 101 reads data received by a socket corresponding to a channel (a port having a certain IP address corresponding to a reception source terminal device) via a certain channel 130 from the source 131 of the network 4, and writes the data to the intermediate buffer 121B. The data is added to the intermediate buffer 121B. Note that the buffer is separately prepared for each channel or socket. In addition, one channel/socket is prepared for each corresponding terminal device (a specific program to be a communication partner of the terminal device) for both transmission and reception. Although one application buffer is illustrated, the application buffer is actually managed separately for transmission and reception. In addition, the intermediate buffer 121B is managed as one buffer pool in all channels, and one intermediate buffer is illustrated. However, the intermediate buffer 121B is managed separately for transmission and reception for each channel, and is distinguished as a reception intermediate buffer and a transmission intermediate buffer for each channel.

Since the subsequent write operation to the application buffer 120 is common to the first embodiment, a description thereof will be omitted.

Next, the application execution means 103 reads data in the application buffer 120 and processes the data by a thread.

In addition, in a case where the data processed by the thread of the application execution means 103 is transmitted to the network 4, the application execution means 103 writes the data processed by the thread in the application buffer 120. In the second embodiment, a case where the application writing means 105 is processed in parallel by multi-threading will be mainly described.

The application writing means 105 writes the data of the application buffer 120 to a transmission destination terminal device, more precisely, the intermediate buffer 121B corresponding to the channel or socket, particularly, the first buffer $121b_1$, for each thread according to the intended transmission destination terminal device. In the first buffer $121b_1$, data is sequentially written in an area prepared for each thread. In order to improve the efficiency of the parallel processing of the application writing means 105, the application writing means 105 writes data (an event as a processing result) to the intermediate buffer 121B in a non-blocking manner.

Next, the socket writing means 102 sequentially moves data from the first buffer $121b_1$ to the second buffer $121b_2$ at an arbitrary timing. The movement includes not only a case where a memory chunk holding data is literally moved from the first buffer $121b_1$ to the second buffer $121b_2$, but also a case where target data is copied to the second buffer and then deleted from the first buffer. In addition, the movement is not limited to a simple one-to-one movement, and includes changing a buffer type, a memory chunk size, and a method of arrangement in the memory chunk by the movement, adjusting the number of events to be moved, and converting into a data holding form that can be easily processed by the OS execution means. In order to perform these conversions in stages, the number of buffers (the number of stages of buffers) may be further increased to provide a third buffer, a fourth buffer, and the like. In addition, in order to reduce the load of memory allocation and release that occurs each time the buffer is used, the memory chunk holding data can be managed by the buffer pool that reuses previously allocated memories. The buffer pool may also be shared by the first buffer and the second buffer. In addition, even in a case where management of each buffer is performed in a plurality of channels, a single buffer pool can be shared. In many cases, the buffer pool holds one type or a plurality of types of memory chunks of a standardized size. Since the buffer pool reuses the memory secured from the system at the time of activation of the communication management program, allocation and release of the memory using the memory of the buffer pool can be easily performed without a system call, and do not cause fragmentation of the system memory even in a case of frequent and complicated use of the memory. An appropriate amount of buffer pool is secured at the time of activation. However, in a case where a shortage occurs at the time of execution, a load is applied to the OS at that time or at a time when the shortage is predicted. Therefore, it is desirable to request the OS to secure an additional memory and expand the buffer pool at a certain appropriate timing if possible. The type of memory of the memory chunk secured by the buffer pool and the size of the chunk are appropriately tuned in a use form. As the memory chunk handled by the first buffer, a memory chunk of a single size slightly larger than an average event size (for example, 256 bytes) is selected from the indirect buffer managed by the normal heap. As the memory chunk handled by the second buffer, a direct buffer of a size and a type easily handled by the OS, for example, the page size or a half (for example, 2 KB) of the page size is selected. As for the size of the memory pool, since buffers collectively acquired from the OS are used in a divided manner, the page size or a value of 1/perfect power of 2 of the page size is adopted in consideration of the page size or the memory boundary, and any value such as 25 bytes or 50 bytes is not adopted.

Next, the movement from the first buffer to the second buffer may be made at predetermined time intervals, may be made when the amount of data accumulated in the first buffer $121b_1$ or the chunks in the first buffer $121b_1$ has reached a predetermined amount, or may be made when the number of events accumulated in the first buffer $121b_1$ or the chunks in the first buffer $121b_1$ has reached a predetermined number.

A trigger of the activation of the socket writing means 102 or a trigger of the movement of the data from the first buffer $121b_1$ to the second buffer $121b_2$ may be polling, a timer, or the like, or may be a time point immediately after the execution of all or some of the application writing means 105.

In a case where three or more stages of buffers are used, the method described for the first buffer and the second buffer described above can be independently adopted between the stages for the timing, trigger, method, and the like of moving data between the buffers in each stage. In the above example, a plurality of operations (the change in memory type of the chunk, the change in chunk size, the limitation on the movement amount, and the like) are simultaneously performed at the time of movement, but it is conceivable to divide the operation and hold the intermediate result as an additional buffer. In this case, the timing and the trigger of the movement may be the same in all the stages.

Next, the socket writing means 102 reads the data of the second buffer $121b_2$ and writes the data to the channel 130 by the socket. The data is transmitted to the source 131 via the channel 130. At this time, the data is retrieved from the second buffer $121b_2$, the OS execution means 100 executes transmission processing as a transmission target, and the transmitted data (all or part of the retrieved data) is deleted from the second buffer $121b_2$. Data whose transmission has not been completed remains in the second buffer $121b_2$. Here, all pieces of data accumulated in the second buffer $121b_2$ are transmitted at a time. However, in a case where the data accumulated in the second buffer $121b_2$ becomes huge, control may be performed in such a way that only a part of the data is read and transmitted without reading all the data at a time, for example, in consideration of restriction of an OS transmission function call. Alternatively, the number of events or the number of bytes to be moved from the first buffer $121b_1$ to the second buffer $121b_2$ may be limited in advance at the time of movement, so that the data accumulated in the second buffer $121b_2$ does not become huge.

Hereinafter, a case where data processed by the thread of the application execution means 103 is transmitted from the OS execution means 100 to the network 4 will be described in detail.

(2) Data Transmission Operation

FIG. 10 is a schematic diagram for describing an example of the data transmission operation. A thread 1 and a thread 2 sequentially generate events A, C, and F and events B, D, and E asynchronously, respectively, call the application writing means 105 and the socket write request means 102a, and transmit the respective events A to F to the network 4. The application writing means 105 adds one event generated by the thread 1 and the thread 2 to the first buffer $121b_1$ and calls the socket writing means 102a. When the OS kernel 100 is already executing the event processing, the socket writing means 102a does not execute the processing. However, when the OS kernel 100 is not executing the event processing, the socket writing means moves 0 or more events held by the first buffer $121b_1$ to the second buffer $121b_2$, and requests the OS kernel 100 to perform the event held by the second buffer $121b_2$. Whether or not the OS kernel 100 is processing an event is managed by the CAS flag provided by the flag management means 107. Once the requested event processing is completed, the OS kernel 100 executes the callback processing means 102b asynchronously with both the thread 1 and the thread 2 by means of a callback thread (a callback thread of the thread 1). After confirming the progress of the event processing and adjusting the second buffer $121b_2$ (deleting the processed event from the second buffer or moving the processed event from the first buffer to the second buffer), the callback thread recursively and exclusively calls the socket writing means a, and also performs the event processing for the event accumulated in the first buffer $121b_1$ during the processing by the OS kernel 100. The callback thread repeats the processing by the socket write request means 102a and the callback processing means 102b, and operates until there is no event held in the intermediate buffer 121B (that is, the first buffer $121b_1$ and the second buffer $121b_2$).

For example, in order to process data by the plurality of threads 1 and 2 and transmit the event A and the event B as processing results to the same terminal device (more precisely, the same socket or channel), the application execution means 103 writes the event A and the event B to the first buffer $121b_1$ corresponding to a socket communicating with a transmission destination terminal by the application writing means 105. It is assumed that the processing by the thread 1 and the thread 2 occur asynchronously. The first buffer $121b_1$ is, for example, a thread-safe non-blocking ring buffer (for example, it can be implemented by registering a pointer of a memory chunk that stores an event in a thread-safe non-blocking FIFO queue java.util.ConcurrentLinkedQueue). The application writing means 105 writes the event A and the event B to different areas (chunks) for each thread in a non-blocking manner (1) (2). In particular, in a case where a memory chunk having a standardized size is used instead of a memory chunk having the size of the event, the memory chunk also manages a start position and an end position of the stored event by using java.nio.ByteBuffer, for example. Furthermore, in a case where an event is stored in a memory chunk of a standardized size, an event whose size is larger than the chunk size may be stored in a chunk group over a plurality of chunks, and a pointer to the chunk group may be added to the ring buffer.

First, for the event A of the thread 1, the application writing means 105 calls the socket write request means 102a to request processing of the event A of the first buffer $121b_1$ (3). Since the caller is the application writing means 105, the socket write request means 102a refers to the CAS flag of the flag management means 107 and sets the flag because the flag is not set (4), checks whether or not an event is accumulated in the first buffer $121b_1$, and moves the event A of the first buffer $121b_1$ to the second buffer $121b_2$ since there is an event (5). Here, similarly to the first buffer $121b_1$, the second buffer $121b_2$ may be, for example, a non-blocking ring buffer (for example, it can be implemented by registering a pointer of a memory chunk that stores an event in a thread-safe non-blocking FIFO queue java.util.ConcurrentLinkedQueue). However, since at most one thread for operating the second buffer is controlled by the flag management means 107, the second buffer does not have to be a thread-safe buffer. After moving the event A to the second buffer $121b_2$, the socket write request means 102a makes a call to proceed to the next processing to the thread 1, entrusts the processing to the OS kernel 100 (6), ends without waiting for completion of the processing by the OS kernel 100, and returns to the processing of the thread 1 (7).

On the other hand, for the event B of the thread 2, the application writing means 105 calls the socket write request means 102a to request processing of the event B of the first buffer $121b_1$ (8). Since the caller is the application writing means 105, the socket write request means 102a refers to the CAS flag of the flag management means 107 (9), and cannot set the flag in this case because the flag has already been set for the processing of the previous event A (4). The socket write request means 102a does not wait until the processing can be executed, ends the processing in a non-blocking manner, and returns to the processing of the thread 2 (10).

For the thread 1, the application execution means 103 continues to process the data, and the application writing means 105 writes the event C as the processing result in the first buffer $121b_1$ (11). The first buffer $121b_1$ holds unprocessed events B and C (11). For the event C of the thread 1, the application writing means 105 calls the socket write request means 102a to request processing of the data (not only the added data C but also the already added data B) in the first buffer $121b_1$ (50). Since the caller is the application writing means 105, the socket write request means 102a refers to the CAS flag of the flag management means 107, and cannot set the flag in this case because the flag has already been set for the processing of the previous data A (4). The socket write request means 102a does not wait until the processing can be executed, ends the processing by the socket write request means 102a in a non-blocking manner, and returns to the processing of the thread 1.

For the network transmission of the event A of the thread 1, specifically, when the socket write request means 102a entrusts the processing to the OS kernel 100 (6), an OS system call (AsynchronousSocketChannel.write( ) of JAVA, for example) is executed, and the event A (12) existing in the second buffer $121b_2$ is specified to request transmission. The socket write request means 102a makes a write request for the event A in the second buffer $121b_2$ to the OS execution means 100 (OS kernel), ends the processing, and returns to the processing of the thread 1 (7).

For the network transmission of the event A of the thread 1, the OS kernel 100 requested to perform transmission divides the event A into appropriate sizes and transmits events A1 and A2 (13), similarly to the first embodiment. The division size, the number of divisions, and the transmission interval depend on the OS, the load of the network, and the like.

On the other hand, for the event B of the thread 2, while the OS kernel 100 is processing the event A, the application writing means 105 subsequently calls the socket write request means 102a to process the event B in the first buffer $121b_1$ (8). However, since the CAS flag of the flag management means 107 is set (9) while the event A is still being processed (4), the socket write request means 102a does not move the event B in the first buffer $121b_1$ to the second buffer $121b_2$, the application writing means 105 ends the processing, and the thread 2 proceeds to the next processing (10). At this point, the events B and C are accumulated in the first buffer $121b_1$, and the event D has not been generated yet (11). The application execution means 103 processes the data by the thread 2 and generates the event D at a later timing.

Next, when the transmission of the event A is completed, the OS kernel 100 requested to transmit the event A by the thread 1 activates the callback processing means 102*b* as the callback thread of the thread 1 (14), and the callback processing means 102*b* checks the number of transmitted bytes. In this case, since the entire event A has been completely transmitted, the event A is deleted from the first buffer 121*b*$_1$ (15). At this point, the events B and C exist in the first buffer 121*b*$_1$ (11). Thereafter, the callback processing means 102*b* calls the socket write request means 102*a* (16).

Subsequently, in the callback thread, the socket write request means 102*a* checks whether or not an event is accumulated in the first buffer 121*b*$_1$, and moves the events B and C in the first buffer 121*b*$_1$ to the second buffer 121*b*$_2$ since there is an event (17). Here, since the capacity of the second buffer 121*b*$_2$ is sufficient, all the events in the first buffer 121*b*$_1$ are moved, but only some of the events accumulated in the first buffer 121*b*$_1$ (for example, only the event B) may be moved in consideration of the capacity of the second buffer 121*b*$_2$ or the like. By chance, at a later timing, the application writing means 105 writes the event D as the processing result to the first buffer 121*b*$_1$ for the event D of the thread 2 (18). At this point, the first buffer 121*b*$_1$ holds only the event D.

For the event C of the thread 1, the socket write request means 102*a* is continuously called, but since the CAS flag of the flag management means 107 is set, the socket write request means 102*a* does not move the event B and the event C in the first buffer 121*b*$_1$ to the second buffer 121*b*$_2$, the application writing means 105 ends the processing, and the processing returns to the thread 1 (19). The application execution means 103 processes the data by the thread 1 and generates the event F at a later timing (20). In addition, for the event B and the event C in the first buffer 121*b*$_1$, as described above, the event processing is executed by the callback thread at a later timing.

Next, in the callback thread, since the caller is the callback processing means 102*b*, the socket write request means 102*a* continues to execute an OS system call and makes a request to transmit the event B and the event C in the second buffer 121*b*$_2$ (21). The socket write request means 102*a* requests the OS execution means 100 (OS kernel) to write the event B in the second buffer 121*b*$_2$, and ends the callback thread.

Next, the OS kernel 100 requested to transmit the events B and C by the callback thread divides the event B and the event C into appropriate sizes and transmits them to the network. First, the event B is divided into three events B1, B2, and B3 and transmitted, and the processing ends (the OS kernel completes the processing). The reason why only the event B is transmitted but the event C is not transmitted or the reason why not a part of the event B but the entire event B is transmitted is the circumstances of the OS, and the load of the server device 1 or the network 4 (22).

For the event D of the thread 2, while the OS kernel 100 is executing the event processing requested to the callback thread of the thread 1, the application writing means 105 subsequently calls the socket write request means 102*a* to process the event D in the first buffer 121*b*$_1$ (23). However, since the CAS flag of the flag management means 107 is set (24) while the events B and C are being processed (16), the socket write request means 102*a* does not move the event D in the first buffer 121*b*$_1$ to the second buffer 121*b*$_2$, the application writing means 105 ends the processing and returns to the thread 2, and the thread 2 proceeds to the next processing (25). The application execution means 103 subsequently processes the data by the thread 2 and generates the event E at a later timing (26). At this point, the event D is accumulated (18) in the first buffer 121*b*$_1$, and the event E has not been generated yet.

Next, when the transmission of the event B is completed, the OS kernel 100 requested to transmit the events B and C by the callback thread activates the callback processing means 102*b* (27), and the callback processing means 102*b* checks the number of transmitted bytes. In this case, since the entire event B has been completely transmitted, the event B is deleted from the first buffer 121*b*$_1$.

At this point, the thread 2 generates the event E, and the application writing means 105 writes the event E to the first buffer 121*b*$_1$. The events D and E exist in the first buffer 121*b*$_1$ (28). In the thread 2, the application writing means 105 that has generated the event E (26) calls the socket write request means 102*a* (30). Since the CAS flag of the flag management means 107 is still set (31) while the event C and the event D are being processed (27), the socket write request means 102*a* does not move the events D and E in the first buffer 121*b*$_1$ to the second buffer 121*b*$_2$, the application writing means 105 ends the processing and returns to the thread 2, and the thread 2 proceeds to the next processing (32).

After the transmission of the event B is completed, the OS kernel 100 requested to transmit the events B and C by the callback thread of the thread 1 activates the callback thread of the thread 1 again, and the activated callback processing means 102*b* calls the socket read request means 102*a* again (29). The socket write request means 102*a* checks whether or not an event is accumulated in the first buffer 121*b*$_1$, and moves the events D and E (28) in the first buffer 121*b*$_1$ to the second buffer 121*b*$_2$ since there is an event (33). At this point, the second buffer 121*b*$_2$ holds the events C, D, and E.

Next, in the callback thread of the thread 1, since the caller is the callback processing means 102*b*, the socket write request means 102*a* executes an OS system call, requests the OS to transmit the events C, D, and E in the second buffer 121*b*$_2$, and ends the callback thread (34).

Next, the OS kernel 100 tries to transmit the events C, D, and E. First, the event C is divided into appropriate sizes (C1, C2, and C3), the events C1 and C2 are transmitted, and the processing ends (the OS kernel completes the processing) (35). The reason why only a part (C1 and C2) of the event C is transmitted (35) and the remaining events C (C3), D, and E are not transmitted is the circumstance of the OS as described above. At this point, the event F is accumulated in the first buffer 121*b*$_1$.

Next, when the transmission of a part of the event C is completed, the OS kernel 100 activates the callback processing means 102*b* (36) again as the callback thread of thread 1, and the callback processing means 102*b* checks the number of transmitted bytes. In this case, since C1 and C2 of the event C have been completely transmitted, portions corresponding to C1 and C2 of the event C are deleted from the second buffer 121*b*$_2$. When C is stored in a single chunk, the memory of the entire chunk cannot be released until the transmission of C3 is completed. For example, in a case where the transmission start position and the transmission end position are managed using java.nio.ByteBuffer, the release of the entire C may be made after the processing of C3 ends, and the completion of C1 and C2 may be made by moving the transmission start position from C1 to C3. Then, the socket write request means 102*a* is called again (37).

Next, in the callback thread, since the caller is the callback processing means 102*b*, the socket write request means 102*a* checks whether or not an event is accumulated in the first buffer 121*b*$_1$. Since the event F is accumulated, the socket write request means 102a moves the event F to the second buffer 121b$_2$. The event F is moved from the first buffer 121b$_1$ to the second buffer 121b$_2$, the first buffer does not hold an event (38) and the second buffer holds the events C3, D, E, and F (39). Subsequently, the socket write request means 102a executes an OS system call, requests the OS execution means 100 (OS kernel) to write the events C3, D, E, and F (39) of the second buffer 121b$_2$, and ends the callback thread (40).

Next, the OS kernel 100 requested to transmit the events C3, D, E, and F divides the events C and D into appropriate sizes and transmits the events C3, D1, and D2 (41). The reason why only the events C3 and D are transmitted and the events E and F are not transmitted is the circumstances of the OS as described above.

Next, when the transmission of the events C and D is completed, the OS kernel 100 requested to transmit the events C3, D, E, and F activates the callback processing means 102b as the callback thread (42), and the callback processing means 102b checks the number of transmitted bytes. In this case, since C3 of the events C and the entire event D have been completely transmitted, the event C3 (or the entire event C) and the event D are deleted from the second buffer 121b$_2$. Then, the socket write request means 102a is called again (43).

Next, in the callback processing, since the caller is the callback processing means 102b, the socket write request means 102a first checks whether or not an event is accumulated in the first buffer 121b$_1$, does not move the event to the second buffer 121b$_2$ since there is no event (38), executes an OS system call, requests the OS execution means 100 (OS kernel) to write the events E and F (44) of the second buffer 121b$_2$, and ends the callback thread (45).

Next, the OS kernel 100 requested to transmit the events E and F divides the events E and F into appropriate sizes and transmits events E1, E2, and F (46).

Next, when the transmission of the events E and F is completed, the OS kernel 100 requested to transmit the events E and F activates the callback processing means 102b as the callback thread (47), and the callback processing means 102b checks the number of transmitted bytes. In this case, since all of the events E and F have been completely transmitted, the events E and F are deleted from the second buffer 121b$_2$. Then, the socket write request means 102a is called again (48).

Thereafter, in the callback thread, since the caller is the callback processing means 102b, the socket write request means 102a sequentially checks the first buffer 121b$_1$ and the second buffer 121b$_2$. Since there is no event in either the first buffer 121b$_1$ or the second buffer 121b$_2$, the CAS flag of the flag management means 107 is released (49), and the callback thread ends.

(Effects of Second Embodiment)

According to the above-described second embodiment, the intermediate buffer 121B is provided between the application writing means 105 and the socket writing means 102, the first buffer 121b$_1$ of the intermediate buffer 121B accumulates write data of the application writing means 105 in a non-blocking manner for each thread, the write operation of the socket write request means 102a is performed according to the CAS flag, the CAS flag is managed by the flag management means 107, the flag is set at the start of writing by the socket write request means 102a, and the flag is released by the callback processing means 102b that has received the notification of the completion of the event processing by the OS execution means 100. In a case where there is an event in the first buffer 121b$_1$, the event is converted into a format suitable for the processing by the OS execution means such as collecting the event in the second buffer 121b$_2$ and then moved, and then the OS execution means 100 processes the event in the second buffer 121b$_2$. Therefore, the write operation of the application writing means 105 does not directly affect the operation of the transmission event processing by the OS execution means 100 (there is no waiting time for the application writing means 105 and the OS execution means 100, and the number of calls of the OS execution means 100 is reduced as compared with a case of calling the OS execution means 100 for each event), and the application processing and the data transmission can be executed in a non-blocking manner to increase a communication speed. In particular, by executing processing of performing transmission to the network requiring a relatively long processing time as, if possible, continuous processing in a non-blocking manner with a short waiting time (latency), it is possible to prioritize the network transmission processing, increase the transmission throughput, and execute the application processing in parallel in a non-blocking manner in a time period while waiting for asynchronous transmission (NIO) processing.

(Modification)

In the above-described second embodiment, the socket write request means 102a may be divided into socket write request means 102a$_1$ configured to request the OS execution means 100 to perform the event processing only in response to a call from the application writing means 105, and socket flash writing means 102a$_2$ configured to request the OS execution means 100 to perform the event processing only in response to a call from the callback processing means 102b. In this case, Step S40 of FIG. 11 is unnecessary, and Step S53 of FIG. 12 is changed to "request the OS execution means 100 to perform the event processing", and the operation of FIG. 13 is performed by the socket flash writing unit 102a$_2$. Also in a case of such implementation, the same effects as those of the second embodiment are obtained.

Other Embodiments

The present invention is not limited to the above embodiments, and various modifications and combinations can be made without departing from the gist of the present invention.

(A) Non-Blocking Exclusive Control by CAS

The basis of the present invention is calling of the OS execution means 100 in a non-blocking manner by the CAS. In the network transmission processing, in the calling of the OS execution means 100, for example, only a part of data requested to be transmitted may be transmitted, and transmissions to the same channel such as setup of a transmission buffer, transmission processing, and adjustment of a transmitted transmission buffer after completion of transmission cannot be performed in parallel. Therefore, some kind of exclusive control is required. Therefore, using the function of the OS, it is common to perform exclusive control in such a way that implementation is made by a synchronized method or the like, only a single thread can be executed at the same time, the other threads wait for the end of the thread being executed, and the execution is resumed one by one for a while. However, in an application such as a game server in which a change of a game object is relayed in a network game in a large amount and at a high frequency, small data is transmitted and received in a large amount and at a high frequency, and thus, the exclusive control using the function of the OS is also performed at a high frequency. Therefore, the overhead of the OS function call cannot be ignored, and the processing performance of the server function is deteriorated. Therefore, the present invention performs the exclusive control using the non-blocking CAS executed by an atomic instruction. During processing of the OS function for an event, even in a case where an attempt is made to call the OS function for another event, the event is not executed and ends without waiting due to the exclusive control of the CAS. Since it is not possible to sequentially execute each event, the event is temporarily accumulated in the buffer, and a method in which the thread executing the OS function processing processes not only the event assumed at the time of activation but also the event accumulated before activation or the event accumulated during the execution of the OS function processing has been devised. In general, since the processing time of the OS function call is longer than that of normal memory processing, in applications such as a game server, there is a high possibility that a new event is accumulated during the OS function call. In the first embodiment and the second embodiment, the non-blocking exclusive control method using two types of CASs has been described, but the present invention is not limited to these two embodiments.

(B) Virtual Ring Buffer Format for Event Accumulation

In a case where it takes time to execute the OS function call, the OS provides a mechanism for processing the function call and the callback separately in such a way that another processing can be executed asynchronously during execution of the function call. Therefore, the callback after the event processing occurs asynchronously with the function call for the event processing. The generation of the event of the application is also asynchronous. In order to arbitrate these, the events need to be accumulated in a ring buffer and the accumulation and processing need to be able to be executed completely asynchronously in such a way that the event processing can be executed with the FIFO. There are various variations of the ring buffer. In the first embodiment, the ring buffer that accumulates the event data in the byte sequence is illustrated, and in the second embodiment, the ring buffer that accumulates the pointer of the memory chunk that accumulates the event data is illustrated. However, the present invention is not limited to the disclosed two methods and modifications thereof.

(C) Asynchronous Processing of Event Accumulation and OS Function Call

Event accumulation can be synchronized with event occurrence. On the other hand, it is sufficient if processing of the accumulated events is activated from the callback for event processing completion. However, in a case where the event processing is not being executed at all, for example, another mechanism is required to activate the first event processing. In the first embodiment and the second embodiment, a method of using event accumulation as a trigger only when the event processing is stopped is disclosed. However, as described above, the trigger may be completely asynchronous with a timer or the like, or may be synchronous with event accumulation once every time or several times. In addition, the trigger may be a function call (a message or function call), signaling using the OS function, or other methods. In the second embodiment, the method of prioritizing a method call from the callback as the trigger in consideration of the efficiency of the event processing of the application has been described. An appropriate method is selected depending on the application to be applied, and the present invention is not limited only to the method disclosed as the embodiments and the modification thereof.

(D) Reuse of Memory

In a case where the allocation and release of the memory are frequently repeated, overhead is caused by the OS function call executed each time the allocation and release of the memory are repeated. Therefore, it is normal to use the buffer pool in which a large memory is secured in advance and the allocation and release of the memory are not requested to the OS but the secured memory is reused. In order to avoid memory fragmentation and accompanying garbage collection and promote memory reuse, it is common that the buffer pool is managed as a set of standardized memory chunks, and a necessary number of chunks are combined and used according to the memory size used by the application. In order to virtually implement the ring buffer, it is preferable to use the buffer pool of the memory. The size and the number of chunks, and the type of the memory to be used (whether it is a direct buffer or an indirect buffer) are appropriately selected according to the application to be applied, and are not limited to the selection by the method disclosed as the embodiments and the modification thereof.

Figure 5:
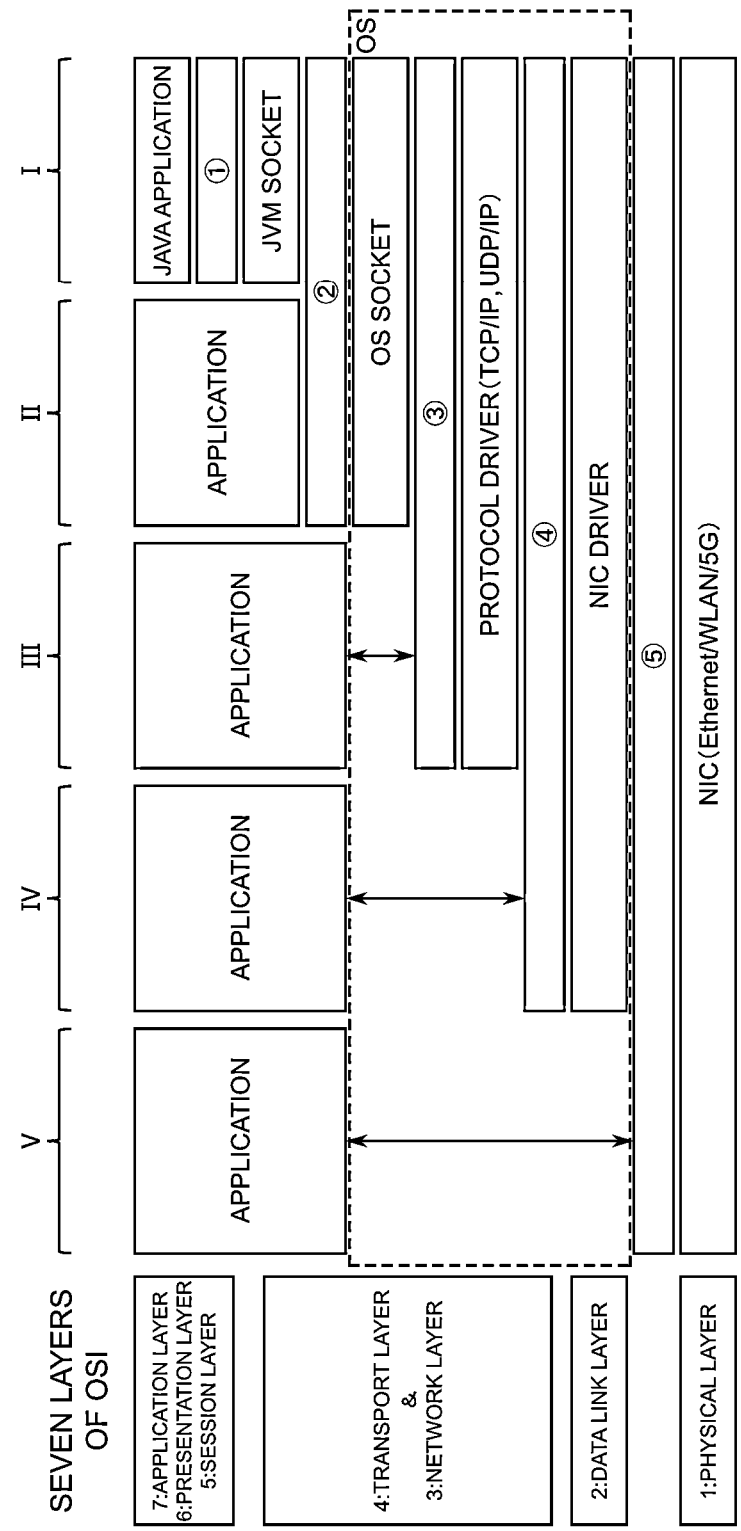
FIG. 5 is a schematic diagram illustrating a modification of a layer configuration.

FIG. 5 is a schematic diagram illustrating a modification of a layer configuration.

For example, although the present application has described an example in which a buffer (a) is provided between an application layer (application 112), a presentation layer, and a session layer (communication management program 111) among seven layers of an open systems interconnection (OSI) reference model, buffers (b) to (e) may be provided at different positions in different layer configurations of II to V.

Here, in order to increase a transmission throughput, it is desirable that the application waits in a lower layer related to transmission, and in order to prevent latency from occurring in the lower layer, the application in a higher layer makes a request and executes a call to the lower layer in a lock-free (non-blocking) manner. Since some sort of gathering occurs from the higher layer to the lower layer, in a multitasking environment, some kind of exclusive control is usually required to prevent data of each thread from being mixed. When "lock (mutex)" of the OS is used for the exclusive control, a processing load is increased, and thus, a lock-free algorithm is desirable. In particular, in a case where a large number of packets for synchronization are transmitted at a high frequency like streaming as in a game server, it is not desirable to apply lock in the units of packet transmission. Since the exclusive control of the OS cannot be used in III to V, it is necessary to independently perform the exclusive control by the application.

In a case of I (the first embodiment and the second embodiment), data is sequentially transmitted to a TCP or user datagram protocol (UDP) channel created by a Java VM (virtual OS). In a case where the same channel is used by a plurality of threads, the exclusive control is required. In a case of a reliable user datagram protocol (RUDP), an application using a UDP socket needs to independently create a reliability guarantee layer such as ACK (affirmative response) or retransmission.

In a case of II, since the difference from I is that whether a virtual OS or a native OS is used, II can be implemented with substantially the same configuration and operation as I.

In a case of III, there is a possibility of implementation by stateless (connectionless) UDP. Since it is not normally possible to directly call a layer inside the OS, the possibility of implementation is low, but it is possible in a case where there is a direct call configuration. A plurality of applications and threads need to be gathered for all communications to a plurality of transmission destinations (terminal devices) sharing an NIC.

In a case of IV, the speed can be increased by bypassing a protocol stack of the OS. The protocol stack needs to be independently produced (for example, a data plane development kit (DPDK) or the like can be used (https://www.dpdk.org/)). An NIC driver is specialized instead of an NDIS and usually depends on a specific NIC product. In a case of the UDP, direct transmission may be possible as datagram without using a socket. Since it is not normally possible to directly call a layer inside the OS, the possibility of implementation is low, but it is possible in a case where there is a dedicated NIC driver like the DPDK. Similarly to III, a plurality of applications and threads need to be gathered for all communications to a plurality of transmission destinations (terminal devices) sharing an NIC.

In a case of V, since the application is completely hardware dependent, the application is used for applications other than special applications such as an embedded system. Similarly to III, a plurality of applications and threads need to be gathered for all communications to a plurality of transmission destinations (terminal devices) sharing an NIC.

Next, the buffers (a) to (e) will be described.

In a case of (a), general usage is JAVA-limited and OS-independent, and multi-threaded application packets (application transmission units) in units of sockets are aggregated in such a way as not to be mixed.

In a case of (b), general usage may be language-dependent and OS-dependent, which is similar to (a). In a case of passing through (a), data may be directly passed by parameter pass-through, or in the case of distributed writing, optimization may be performed in such a way that data is collected into one transmission buffer in a case where a transmission byte buffer is in a continuous area. Here, the distributed writing refers to, for example, a function of AsynchronousSocketChannel.write( ) in Java in which a transmission request is made by specifying a plurality of buffers obtained by grouping one or more variable-length data blocks.

In a case of (c), a work of the OS kernel in the OS is usually performed, and applications are aggregated for each protocol in a cross-sectional manner. Note that it is necessary to add a protocol header. A data stream state for each connection and a boundary of application packet transmission units at the time of being written in a TCP socket do not matter. Data is divided into appropriate sizes and passed to a protocol driver. At this time, there is a possibility that copying or refilling of data occurs. In a case of a UDP socket, since the UDP socket is connectionless, in a case where data is written in the socket, the data is transmitted without being buffered, and is not collectively transmitted. In a case where a plurality of pieces of data are collectively transmitted by the RUDP, the data is collectively written before being written to the UDP socket.

In a case of (d), a work of the protocol driver inside the OS is usually performed, and the application gathers various protocols for each NIC in a cross-sectional manner. Note that it is necessary to add a protocol header. All pieces of data combined with each packet, divided, and added with a protocol header are gathered for each NIC.

In a case of (e), a work inside the NIC is performed. Processing such as division, combination, and compression according to the network type, and addition of a header are performed, and conversion into an electrical signal corresponding to a bit string is made, and the electrical signal is transmitted to a communication line.

In the above embodiment, the functions of the means 100 to 107 of the control unit 10 are implemented by the program, but all or a part of the means may be implemented by hardware such as an ASIC. In addition, the program employed in the above embodiment can be provided in a state of being stored in a recording medium such as a CD-ROM. Furthermore, replacement, deletion, addition, and the like of the steps described in the above embodiment can be made within such a scope that the gist of the present invention is not changed. In addition, the function of each means may be appropriately coupled to another means or may be separated into a plurality of means.

Although the processing of the network transmission event has been mainly described in the above embodiments, the present invention does not limit the processing target event to only the network transmission event. All or some of the means of the present invention can be applied to the event processing other than network transmission, in particular, processing that requires a relatively long time to request the OS function to perform the processing operation (processing of providing the processing request means and the callback means to enable the OS function to execute asynchronous processing, typically, various I/O operations), more specifically, by replacing the request means and the callback means corresponding to an output operation with respect to various media such as a network and a disk. Further, in order to sequentially call the OS function a plurality of times to execute the event processing, the event processing mechanism of the present invention can be combined in a plurality of stages.

INDUSTRIAL APPLICABILITY

Provided are an information processing program, an information processing device, and an information processing method that enable application processing and data transmission in a non-blocking manner to increase a communication speed.

REFERENCE SIGNS LIST

1 Server device
2a, 2b, 2c Terminal device
4 Network
10 Control unit
11 Storage unit
12 Memory
13 Communication unit
100 OS execution means (OS kernel)
101 Socket reading means
102 Socket writing means
102a Socket write request means
102b Callback processing means
103 Application execution means
104 Application reading means
105 Application writing means
106 Buffering means
107 Flag management means
111 Communication management program
112 Application
120 Application Buffer
121 Ring buffer
121B Intermediate buffer
$121b_1$ First buffer
$121b_2$ Second buffer
130 Channel
131 Source

The invention claimed is:

1. A non-transitory computer-readable medium containing executable instructions which when executed by one or more processors of a computer, cause the computer to perform operations comprising:
preparing a buffer;
accumulating events to be processed in the buffer;
processing the accumulated events; and
receiving a call and setting or releasing a flag, wherein execution of the instructions to process the accumulated events includes:
requesting an event processing, and
receiving a completion notification in a case where the event processing is completed;
execution of the instructions to receive the call and set or release the flag includes:
exclusively setting the flag before starting the event processing requested by execution of the instructions to request the event processing, and
releasing the flag after the event processing by execution of the instructions to receive a completion notification in a case where the event processing is completed; and
execution of the instructions to request the event processing includes:
receiving a call after the event accumulation in the buffer by execution of the instructions to accumulate events to be processed, and after the event processing by the execution of the instructions to receive a completion notification in a case where the event processing is completed, and
in a case where the flag is not set, the event processing is not executed, and
in a case where the flag is set by execution of the instructions to receive the call and exclusively set the flag, the events accumulated in the buffer are processed.

2. The non-transitory computer-readable medium according to claim 1,
wherein the buffer includes a first buffer configured to accumulate events and a second buffer configured to accumulate the events accumulated in the first buffer, and
in a case where the flag is set, the events are moved from the first buffer to the second buffer to accumulate the events in the second buffer, and all or some of the events accumulated by the second buffer are processed, by the execution of the instructions to request event processing.

3. The non-transitory computer-readable medium according to claim 2, further comprising one or more of a third buffer between the first buffer and the second buffer, upstream of the first buffer or downstream of the second buffer.

4. The non-transitory computer-readable medium according to claim 2, wherein at least one of a size of a data block of the accumulated events, a number of the data blocks, a type of the data block, or an event holding format of the data block changes in moving between the first buffer and the second buffer.

5. The non-transitory computer-readable medium according to claim 2, wherein a number and a size of moved events are limited under a predetermined condition to move between the first buffer and the second buffer.

6. The non-transitory computer-readable medium according to claim 1, wherein an event accumulation operation by executing the instructions to accumulate events to be processed and a processing operation by executing the instructions to process the accumulated events are asynchronously performed in the buffer.

7. The non-transitory computer-readable medium according to claim 1, wherein each of the instructions to process the accumulated events executed by a plurality of event generation sources operating in parallel accumulate events asynchronously in the buffer.

8. The non-transitory computer-readable medium according to claim 1, wherein the buffer is a ring buffer.

9. The non-transitory computer-readable medium according to claim 1, wherein the buffer is a ring buffer that is configured to sequentially accumulate the event itself in a memory area.

10. The non-transitory computer-readable medium according to claim 2, wherein the buffer has a two-stage ring buffer configuration comprising:
a first-stage ring buffer configured to accumulate parallelly operating events by executing the instructions to accumulate events to be processed, and
a second-stage ring buffer configured to concatenate and divide the events into a size determined by executing the instructions to process the accumulated events, and further configured to hold the accumulated events by a number determined according to execution of the instructions to process the accumulated events.

11. The non-transitory computer-readable medium according to claim 1, wherein the buffer stores the events in a direct buffer.

12. The information processing program according to claim 1, wherein the buffer accumulates the events in a buffer pool.

13. The non-transitory computer-readable medium according to claim 10, wherein the buffer includes different buffer sizes in the first-stage ring buffer and the second-stage ring buffer.

14. The non-transitory computer-readable medium according to claim 1, wherein the event processing is ended by executing the instructions to process the accumulated events after processing all the accumulated events.

15. An information processing device comprising:
a non-transitory computer-readable medium containing executable instructions which when executed by one or more processors of a computer, causes the computer to perform operations comprising:
preparing a buffer;
accumulating an event to be processed;
processing the accumulated event; and
receiving a call and exclusively setting or releasing a flag,
wherein execution of the instructions to process the accumulated events includes:
requesting an event processing, and receiving a completion notification in a case where the event processing is completed;
execution of the instructions to receive the call and exclusively set or release the flag includes:
exclusively setting the flag before starting the event processing requested by execution of the instructions to request the event processing, and
releasing the flag after the event processing by execution of the instructions to receive a completion notification in a case where the event processing is completed; and
execution of the instructions to request event processing includes:
receives a call after the event accumulation in the buffer by execution of the instructions to accumulate events to be processed and after the event processing by the execution of the instructions to receive a completion notification in a case where the event processing is completed, and in a case where the flag is not set by execution of the instructions to receive the call and exclusively release the flag, the event processing is not executed, and in a case where the flag is set by execution of the instructions to receive the call and exclusively set the flag, the event accumulated by the buffer is processed.

16. An information processing method executed by a computer, the information processing method comprising:

an event accumulation step of accumulating events to be processed;

a buffering step of accumulating the events;

a processing step of processing the accumulated events; and a flag management step of receiving a call and exclusively setting a flag, wherein the processing step includes a processing request step of requesting event processing, and a callback processing step of receiving a completion notification in a case where the event processing is completed, in the flag management step, the flag is exclusively set before the event processing requested in the processing request step starts, and the flag is released after the processing in the callback processing step ends, and in the processing request step, a call is received after the event accumulation in the event accumulation step ends and after the event processing in the callback processing step ends, and in a case where the flag is not set, the event processing is not executed, and in a case where the flag is set, the accumulated events are processed.

* * * * *